(12) United States Patent
Kim et al.

(10) Patent No.: US 8,730,697 B2
(45) Date of Patent: May 20, 2014

(54) METHOD AND APPARATUS FOR WIRELESS POWER TRANSMISSION USING POWER RECEIVER

(75) Inventors: Dong Zo Kim, Yongin-si (KR); Sang Wook Kwon, Seongnam-si (KR); Yun Kwon Park, Dongducheon-si (KR); Eun Seok Park, Suwon-si (KR); Young Tack Hong, Seongnam-si (KR); Ki Young Kim, Yongin-si (KR); Young Ho Ryu, Yongin-si (KR); Nam Yun Kim, Seoul (KR); Jin Sung Choi, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 13/472,762

(22) Filed: May 16, 2012

(65) Prior Publication Data

US 2012/0294054 A1 Nov. 22, 2012

(30) Foreign Application Priority Data

May 17, 2011 (KR) .................. 10-2011-0046188

(51) Int. Cl.
*H02M 7/68* (2006.01)
(52) U.S. Cl.
USPC .............................. 363/84; 363/88
(58) Field of Classification Search
USPC .................................. 363/84, 88, 89
See application file for complete search history.

(56) References Cited

U.S. PATENT DOCUMENTS

| | | | | |
|---|---|---|---|---|
| 6,841,981 B2* | 1/2005 | Smith et al. | ................... | 323/312 |
| 7,027,311 B2* | 4/2006 | Vanderelli et al. | ................ | 363/8 |
| 8,040,103 B2* | 10/2011 | Hui et al. | ...................... | 320/108 |
| 8,461,817 B2* | 6/2013 | Martin et al. | .................. | 323/282 |
| 2001/0017781 A1 | 8/2001 | Hideaki | | |
| 2005/0104453 A1* | 5/2005 | Vanderelli et al. | ............. | 307/151 |
| 2008/0083969 A1* | 4/2008 | Osada | ........................... | 257/595 |
| 2008/0290822 A1* | 11/2008 | Greene et al. | ................. | 315/363 |
| 2009/0067198 A1* | 3/2009 | Graham et al. | .................... | 363/8 |
| 2009/0067208 A1* | 3/2009 | Martin et al. | ................. | 363/126 |
| 2009/0237029 A1* | 9/2009 | Andelfinger | ................. | 320/108 |
| 2010/0127660 A1* | 5/2010 | Cook et al. | .................... | 320/108 |

FOREIGN PATENT DOCUMENTS

| | | |
|---|---|---|
| JP | 2000-245077 A | 9/2000 |
| JP | 2008-295297 A | 12/2008 |
| KR | 10-2009-0011509 A | 2/2009 |
| KR | 10-2011-0009225 A | 1/2011 |
| WO | WO 2009/140218 A1 | 11/2009 |

* cited by examiner

*Primary Examiner* — Bao Q Vu
(74) *Attorney, Agent, or Firm* — NSIP Law

(57) ABSTRACT

A rectifier is provided. The rectifier includes a first rectification unit having an anode connecting to a negative radio frequency (RF) port and a cathode connecting to a positive direct current (DC) port, a second rectification unit having an anode connecting to a positive RF port and a cathode connecting to the positive DC port, a third rectification unit having an anode connecting to a ground and a cathode connecting to the negative RF port, and a fourth rectification unit having an anode connecting to the ground and a cathode connecting to the positive RF port. The first rectification unit includes a plurality of first diodes that are connected in parallel, and the second rectification unit includes a plurality of second diodes that are connected in parallel.

15 Claims, 22 Drawing Sheets

FIRST SCHOTTKY DIODE

SECOND SCHOTTKY DIODE

FIRST SCHOTTKY DIODE

SECOND SCHOTTKY DIODE

FIRST SCHOTTKY DIODE

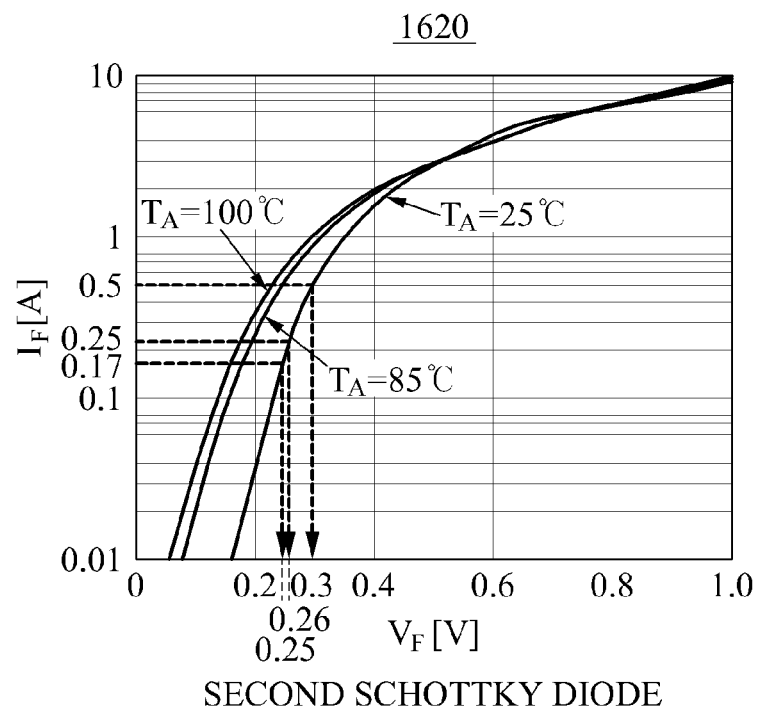

METHOD AND APPARATUS FOR WIRELESS POWER TRANSMISSION USING POWER RECEIVER

CROSS-REFERENCE TO RELATED APPLICATION(S)

This application claims the benefit under 35 U.S.C. §119 (a) of Korean Patent Application No. 10-2011-0046188, filed on May 17, 2011, in the Korean Intellectual Property Office, the entire disclosure of which is incorporated herein by reference for all purposes.

BACKGROUND

1. Field

The following description relates to a method and an apparatus for wireless power transmission using a power receiver.

2. Description of Related Art

A wireless power refers to energy transferred from a wireless power transmitter to a wireless power receiver via magnetic coupling.

Research has been conducted on various products ranging from a high power application requiring a power above 100 W to a low power application requiring a power less than 10 W. As an example, a wireless power application requiring a power of less than 10 W may relate to a mobile device.

A wireless power receiver may charge a battery using a received energy. A wireless power transmission and charging system includes a source device and a target device. The source device may wirelessly transmit power. On the other hand, the target device may wirelessly receive power. In other words, the source device may be referred to as a wireless power transmitter, and the target device may be referred to as a wireless power receiver.

The source device includes a source resonator, and the target device includes a target resonator. As an aspect, magnetic coupling or resonance coupling may be formed between the source resonator and the target resonator. The source device and the target device may communicate with each other. During communications, the transmission or reception of control and state information may occur.

SUMMARY

In one general aspect, a rectifier is provided. The rectifier includes a first rectification unit having an anode and a cathode, the anode being connected to a negative radio frequency (RF) port, and the cathode being connected to a positive direct current (DC) port, a second rectification unit having an anode and a cathode, the anode being connected to a positive RF port, and the cathode being connected to the positive DC port, a third rectification unit having an anode and a cathode, the anode being connected to a ground, and the cathode being connected to the negative RF port, and a fourth rectification unit having an anode and a cathode, the anode being connected to the ground, and the cathode being connected to the positive RF port. The first rectification unit includes a plurality of first diodes that are connected in parallel, and the second rectification unit includes a plurality of second diodes that are connected in parallel.

The first rectification unit may include two first diodes, and the second rectification unit may include two second diodes.

The third rectification unit may include a plurality of third diodes that are connected in parallel, and the fourth rectification unit may include a plurality of fourth diodes that are connected in parallel.

The third rectification unit may include a first N-metal-oxide-semiconductor field-effect transistor (N-MOSFET). The fourth rectification unit may include a second N-MOSFET. A gate of the first N-MOSFET may be connected to the positive RF port, a source of the first N-MOSFET may be connected to the negative RF port, and a drain of the first N-MOSFET may be connected to the ground. A gate of the second N-MOSFET may be connected to the negative RF port, a source of the second N-MOSFET may be connected to the ground, and a drain of the second N-MOSFET may be connected to the positive RF port.

A resistance of the first N-MOSFET may be equal to or less than 200 milliohm (m$\Omega$), and an input capacitance of the first N-MOSFET may be equal to or less than 300 picofarads (pF). A resistance of the second N-MOSFET may be equal to or less than 200 m$\Omega$, and an input capacitance of the second N-MOSFET may be equal to or less than 300 pF.

The rectifier may include a capacitor connected to the positive DC port and the ground.

In another aspect, a power receiver is provided. The power receiver includes a resonator configured to receive a power, a rectifier configured to receive the power from the resonator via a positive radio frequency (RF) port and a negative RF port, and to rectify the received power, and a direct current (DC)-to-DC (DC/DC) converter configured to convert the rectified power. The rectifier includes a first rectification unit having an anode and a cathode, the anode being connected to the negative RF port, and the cathode being connected to a positive DC port, a second rectification unit having an anode and a cathode, the anode being connected to the positive RF port, and the cathode being connected to the positive DC port, a third rectification unit having an anode and a cathode, the anode being connected to a ground, and the cathode being connected to the negative RF port, and a fourth rectification unit having an anode and a cathode, the anode being connected to the ground, and the cathode being connected to the positive RF port. The first rectification unit includes a plurality of first diodes connected in parallel, and the second rectification unit includes a plurality of second diodes connected in parallel.

The third rectification unit may include a plurality of third diodes that are connected in parallel, and the fourth rectification unit may include a plurality of fourth diodes that are connected in parallel.

The third rectification unit may include a first N-metal-oxide-semiconductor field-effect transistor (N-MOSFET). The fourth rectification unit may include a second N-MOSFET. A gate of the first N-MOSFET may be connected to the positive RF port, a source of the first N-MOSFET may be connected to the negative RF port, and a drain of the first N-MOSFET may be connected to the ground. A gate of the second N-MOSFET may be connected to the negative RF port, a source of the second N-MOSFET may be connected to the ground, and a drain of the second N-MOSFET may be connected to the positive RF port.

The rectifier may include a capacitor connected to the positive DC port and the ground.

In another aspect, a power receiving method is provided. The power receiving method includes receiving, by a resonator, a power, receiving, by a rectifier, the power from the resonator via a positive radio frequency (RF) port and a negative RF port, and rectifying the received power, and converting, by a direct current (DC)-to-DC (DC/DC) converter, the rectified power. The rectifier includes a first rectification unit having an anode and a cathode, the anode being connected to the negative RF port, and the cathode being connected to a positive DC port, a second rectification unit having an anode and a cathode, the anode being connected to the positive RF port, and the cathode being connected to the positive DC port, a third rectification unit having an anode and a cathode, the anode being connected to a ground, and the cathode being connected to the negative RF port, and a fourth rectification unit having an anode and a cathode, the anode being connected to the ground, and the cathode being connected to the positive RF port. The first rectification unit includes a plurality of first diodes connected in parallel, and the second rectification unit includes a plurality of second diodes connected in parallel.

The third rectification unit may include a plurality of third diodes that are connected in parallel, and the fourth rectification unit may include a plurality of fourth diodes that are connected in parallel.

The third rectification unit may include a first N-metal-oxide-semiconductor field-effect transistor (N-MOSFET). The fourth rectification unit may include a second N-MOSFET. A gate of the first N-MOSFET may be connected to the positive RF port, a source of the first N-MOSFET may be connected to the negative RF port, and a drain of the first N-MOSFET may be connected to the ground. A gate of the second N-MOSFET may be connected to the negative RF port, a source of the second N-MOSFET may be connected to the ground, and a drain of the second N-MOSFET may be connected to the positive RF port.

The rectifier may include a capacitor connected to the positive DC port and the ground.

A non-transitory computer readable recording medium storing a program may cause a computer to implement the method.

Other features and aspects may be apparent from the following detailed description, the drawings, and the claims.

BRIEF DESCRIPTION OF THE DRAWINGS

FIGS. 16A and 16B are graphs illustrating examples of current-to-voltage curves indicating a voltage drop of a full-bridge rectifier in which three Schottky diodes are used in parallel.

Figure 1:
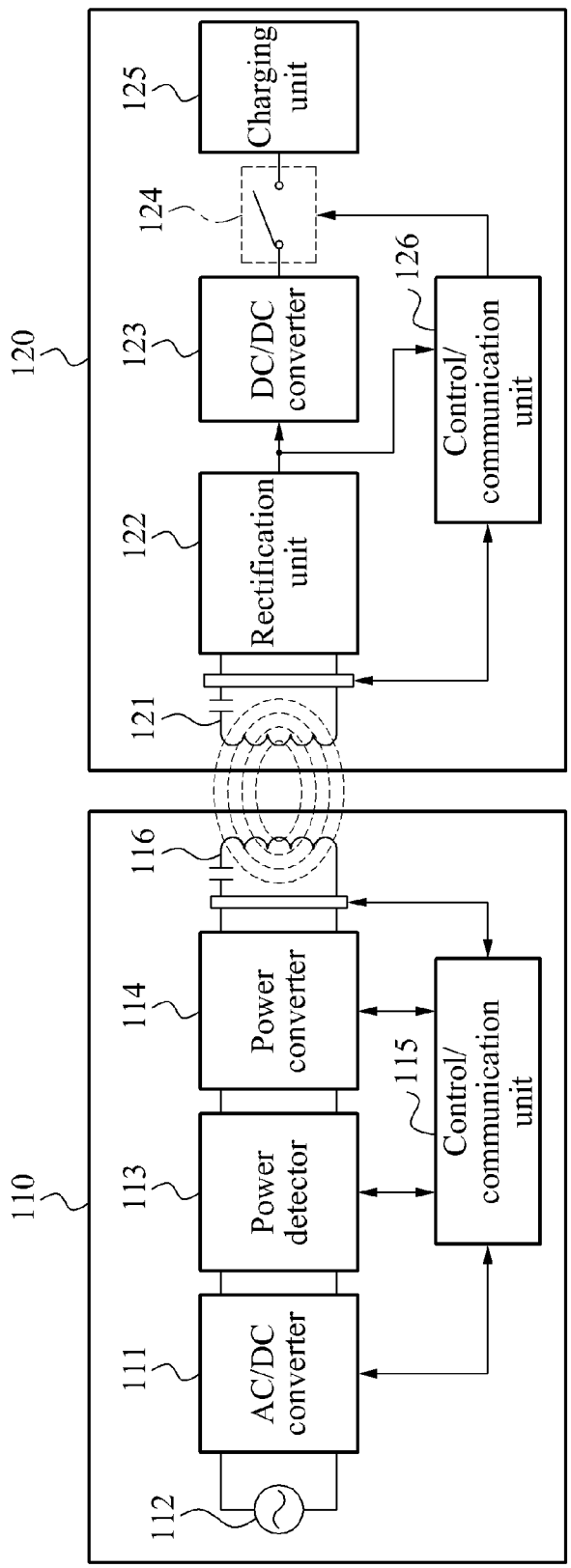
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of a wireless power transmission system.

Referring to FIG. 1, the wireless power transmission system includes a source device 110, and a target device 120.

The source device 110 may include an alternating current-to-direct current (AC/DC) converter 111, a power detector 113, a power converter 114, a control/communication unit 115, and a source resonator 116.

The target device 120 may include a target resonator 121, a rectification unit 122, a DC-to-DC (DC/DC) converter 123, a switch unit 124, a charging unit 125, and a control/communication unit 126.

The AC/DC converter 111 may rectify an AC voltage in a band of tens of hertz (Hz) output from a power supply 112 to generate a DC voltage. The AC/DC converter 111 may output a DC voltage of a predetermined level, or may adjust an output level of a DC voltage based on the control of the control/communication unit 115.

The power detector 113 may detect an output current and an output voltage of the AC/DC converter 111, and the power detector 113 may transfer information on the detected current and the detected voltage, to the control/communication unit 115. In addition, the power detector 113 may detect an input current and an input voltage of the power converter 114.

The power converter 114 may use a switching pulse signal in a band of a few megahertz (MHz) to tens of MHz to convert a DC voltage of a predetermined level to an AC voltage to generate a power.

As an example, the power converter 114 may use a resonance frequency to convert a DC voltage to an AC voltage and the power converter 114 may generate a "communication power used for communication" or a "charging power used for charging." The communication power and the charging power may be used in the target device 120. The communication power may refer to an energy used to activate a communication module and a processor of the target device 120. Accordingly, the communication power may be referred to as a "wake-up power." Additionally, the communication power may be transmitted in the form of a constant wave (CW) for a predetermined period of time. The charging power may refer to an energy used to charge a battery connected to the target device 120 or a battery included in the target device 120. The charging power may continue to be transmitted, at a higher power level than the communication power, for a predetermined period of time. For example, the communication power may have a power level of 0.1 Watt (W) to 1 W, and the charging power may have a power level of 1 W to 20 W.

The control/communication unit 115 may control a frequency of a switching pulse signal. The frequency of the switching pulse signal may be determined under the control of the control/communication unit 115. The control/communication unit 115 may control the power converter 114 to generate a modulation signal to be transmitted to the target device 120. In other words, the control/communication unit 115 may use in-band communication to transmit various messages to the target device 120. Additionally, the control/communication unit 115 may detect a reflected wave, and the control/communication unit 115 may demodulate a signal received from the target device 120 through an envelope of the detected reflected wave.

The control/communication unit 115 may use various schemes to generate a modulation signal for in-band communication. The control/communication unit 115 may turn on or off a switching pulse signal, or may perform delta-sigma modulation, to generate a modulation signal. Additionally, the control/communication unit 115 may generate a pulse-width modulation (PWM) signal with a predetermined envelope.

The control/communication unit 115 may perform out-band communication that employs a separate communication channel, instead of a resonance frequency. The control/communication unit 115 may include a communication module. The communication module may be a ZigBee module, a Bluetooth module, and the like. The control/communication unit 115 may transmit data to the target device 120 using the out-band communication or receive data from the target device 120 using the out-band communication.

The source resonator 116 may transfer an electromagnetic energy to the target resonator 121. As an aspect, the source resonator 116 may transfer a "communication power used for communication" to the target device 120 or a "charging power used for charging" to the target device 120 using a magnetic coupling with the target resonator 121.

The target resonator 121 may receive the electromagnetic energy from the source resonator 116. As an aspect, the target resonator 121 may receive the "communication power" or "charging power" from the source device 110 using the magnetic coupling with the source resonator 116. As another aspect, the target resonator 121 may use the in-band communication to receive various messages from the source device 110.

The rectification unit 122 may rectify an AC voltage to generate a DC voltage. In this example, the AC voltage may be received from the target resonator 121.

The DC/DC converter 123 may adjust a level of the DC voltage output from the rectification unit 122, based on a capacity of the charging unit 125. For example, the DC/DC converter 123 may adjust, to, for example, 3 volt (V) to 10 V, the level of the DC voltage output from the rectification unit 122.

The switch unit 124 may be turned on or off, under the control of the control/communication unit 126. In response to the switch unit 124 being turned off, the control/communication unit 115 of the source device 110 may detect a reflected wave. In other words, in response to the switch unit 124 being turned off, the magnetic coupling between the source resonator 116 and the target resonator 121 may be substantially reduced.

The charging unit 125 may include a battery. The charging unit 125 may use a DC voltage output from the DC/DC converter 123 to charge the battery.

The control/communication unit 126 may use a resonance frequency to perform in-band communication for transmitting or receiving data. During the in-band communication, the control/communication unit 126 may detect a signal between the target resonator 121 and the rectification unit 122, or detect an output signal of the rectification unit 122 to demodulate a received signal. In other words, the control/communication unit 126 may demodulate a message received using the in-band communication.

As another aspect, the control/communication unit 126 may adjust an impedance of the target resonator 121, to modulate a signal to be transmitted to the source device 110. As an example, the control/communication unit 126 may turn on or off the switch unit 124 to modulate the signal to be transmitted to the source device 110. For example, the control/communication unit 126 may increase the impedance of the target resonator 121. Based on the increase of the impedance of the target resonator 121, a reflected wave may be detected from the control/communication unit 115 of the source device 110. In this example, depending on whether the reflected wave is detected, the control/communication unit 115 may detect a binary number "0" or "1."

The control/communication unit 126 may also perform out-band communication that employs a communication channel. The control/communication unit 126 may include a communication module. The communication module may be a ZigBee module, a Bluetooth module, and the like. The control/communication unit 126 may transmit to the source device 110 using the out-band communication or receive data from the source device 110 using the out-band communication.

Figure 2:
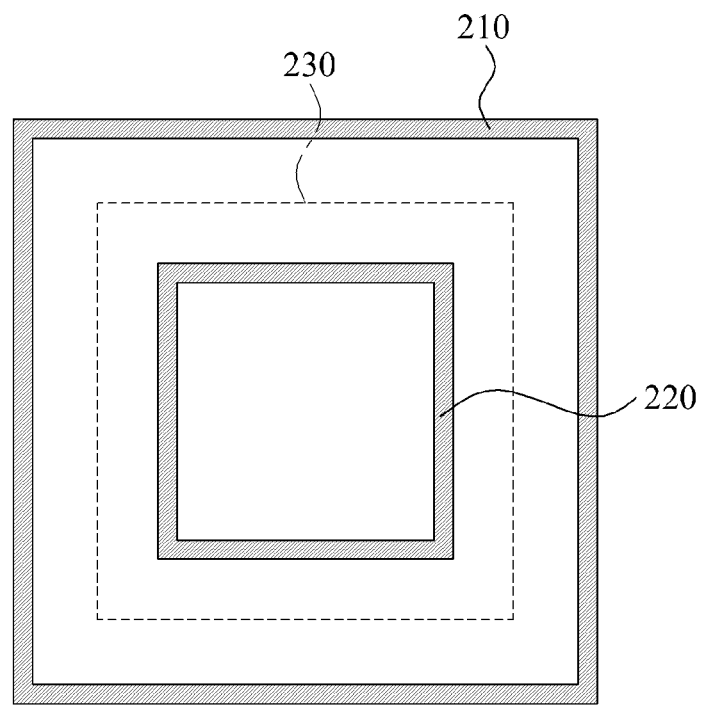
FIG. 2 is a diagram illustrating an example of a wireless power transmitter.

FIG. 2 illustrates an example of a wireless power transmitter.

Referring to FIG. 2, the wireless power transmitter includes a source resonator 210, a sub-resonator 220, and a magnetic field distribution controller 230.

The source resonator 210 may form a magnetic coupling with a target resonator. The source resonator 210 may wirelessly transmit power to a target device through the magnetic coupling. The source resonator 210 may have a loop shape as illustrated in FIG. 2. As another aspect, the loop shape may be implemented in various shapes. For example, the shapes may include a spiral shape, a helical shape, and the like.

Additionally, the wireless power transmitter may include a matcher (not illustrated) to be used in impedance matching. The matcher may adjust a strength of a magnetic field of the source resonator 210 to an appropriate level. An impedance of the source resonator 210 may be determined by the matcher. The matcher may have the same shape as the source resonator 210. Additionally, the matcher may have a predetermined location relationship with a capacitor located in the source resonator 210 to adjust the strength of the magnetic field. For example, the matcher may be electrically connected to the source resonator 210 in both ends of the capacitor.

As an example, the matcher may be located within a loop of the loop structure of the source resonator 210. The matcher may change the physical shape of the matcher to adjust the impedance of the source resonator 210.

The sub-resonator 220 may be located within the source resonator 210. A plurality of sub-resonators may be located within the source resonator 210. Additionally, a sub-sub-resonator may be located within the sub-resonator 220. The sub-resonator 220 may influence a distribution of a magnetic field formed within the source resonator 210. For example, a current flowing in the source resonator 210 may form a magnetic field, and the formed magnetic field may induce a current to the sub-resonator 220. In this example, a distribution of the magnetic field formed within the source resonator 210 may be determined based on a direction of the current flowing in the source resonator 210 and in the sub-resonator 220. As another aspect, the direction of the current flowing in the sub-resonator 220 may be determined based on a ratio of a resonance frequency of the sub-resonator 220 to a resonance frequency of the source resonator 210.

The resonance frequency of the source resonator 210 may be related to an inductance value L, and a capacitance value C of the source resonator 210. Similarly, the resonance frequency of the sub-resonator 220 may be related to an inductance value and a capacitance value of the sub-resonator 220.

The magnetic field distribution controller 230 may be located in a predetermined area within the source resonator 210. The magnetic field distribution controller 230 may control the direction of the current flowing in the source resonator 210 or in the sub-resonator 220. The magnetic field distribution controller 230 may control the distribution of the magnetic field formed within the source resonator 210.

The direction of the current flowing in the source resonator 210, or the direction of the current flowing in the sub-resonator 220 may be related to the ratio of the resonance frequency of the sub-resonator 220 to the resonance frequency of the source resonator 210.

The magnetic field distribution controller 230 may control the resonance frequency of the source resonator 210, or the resonance frequency of the sub-resonator 220. As an example, the magnetic field distribution controller 230 may control the resonance frequency of the source resonator 210 based on changing the capacitance of the source resonator 210. As another aspect, the magnetic field distribution controller 230 may control the resonance frequency of the sub-resonator 220 based on adjusting the capacitance and the inductance of the sub-resonator 220. The magnetic field distribution controller 230 may adjust a length and a width of a line that forms the sub-resonator 220 to control the inductance value of the sub-resonator 220.

The magnetic field distribution controller 230 may control the direction of the current flowing in the source resonator 210, or the magnetic field distribution controller 230 may control the direction of the current flowing in the sub-resonator 220, so that the strength of the magnetic field formed within the source resonator 210 may be increased or decreased.

As another aspect, the magnetic field distribution controller 230 may control the distribution of the magnetic field, so that the magnetic field may be uniformly distributed in the source resonator 210. As an example, the magnetic field distribution controller 230 may control the resonance frequency of the sub-resonator 220, and the magnetic field distribution controller 230 may control the magnetic field to be uniformly distributed in the source resonator 210. The configuration of the sub-resonator 220 will be further described with reference to FIG. 8.

The magnetic field distribution controller 230 may use a sub-sub-resonator to control the distribution of the magnetic field formed within the source resonator 210. The magnetic field distribution controller 230 may control a resonance frequency of the sub-sub-resonator, and the magnetic field distribution controller 230 may compensate for the uniform distribution of the magnetic field formed within the source resonator 210. The magnetic field distribution controller 230 may control the direction of the current flowing in the sub-resonator 220 and a direction of a current flowing in the sub-sub-resonator, and the magnetic field distribution controller 230 may control the distribution of the magnetic field. The sub-sub-resonator may be located in the sub-resonator 220. The sub-sub-resonator may support the sub-resonator 220, and the sub-sub-resonator may compensate for the distribution of the magnetic field formed within the source resonator 210, so that the magnetic field may be uniformly distributed. The sub-sub-resonator may compensate for the distribution of the magnetic field adjusted by the sub-resonator 220, so that the magnetic field may be uniformly distributed in the source resonator 210.

The magnetic field distribution controller 230 may include at least one coil. The at least one coil may be used to induce the magnetic field formed within the source resonator 210 towards the center of the source resonator 210. As another aspect, the magnetic field distribution controller 230 may use the at least one coil to control the magnetic field formed within the source resonator 210 to be uniformly distributed.

The magnetic field distribution controller 230 may control a resonance frequency of the at least one coil, so that a current may flow in the at least one coil in the same direction as the current flowing in the source resonator 210.

In an example, at least one coil may be located in the center of the source resonator 210, and the at least one coil may form at least one loop structure with different sizes. The magnetic field distribution controller 230 may use the at least one coil of various sizes to more precisely control the magnetic field formed within the source resonator 210.

In another example, at least one coil having the same shape as another coil may be located in a predetermined position within the source resonator 210. The at least one coil having the same shape as another coil may be located in various areas within the source resonator 210. Under the control of the magnetic field distribution controller 230, the at least one coil having the same shape as another coil may increase or decrease the strength of the magnetic field formed within the source resonator 210 in the various areas in which the at least one coil having the same shape as another coil is located.

In yet another example, the at least one coil may be located in the center of the source resonator 210. The at least one coil may be formed in a spiral shape. As another example, the at least one coil may be formed with various shapes, and the at least one coil may adjust the magnetic field formed within the source resonator 210.

The magnetic field distribution controller 230 may include a plurality of shielding layers. The plurality of shielding layers may have different sizes and heights located at the center of the source resonator 210, and the plurality of shielding layers may have a loop structure. Due to the plurality of shielding layers being located at the center of the source resonator 210 and having the loop structure, the magnetic field distribution controller 230 may induce the magnetic field formed within the source resonator 210 to be uniformly distributed. A magnetic flux of the magnetic field formed within the source resonator 210 may be refracted from the plurality of shielding layers, and the magnetic flux of the magnetic field may be more concentrated on the center of the source resonator 210.

The magnetic field distribution controller 230 may include a layer formed of a mu negative (MNG) material, a double negative (DNG) material, or a magneto-dielectric material. The magnetic field distribution controller 230 may refract the magnetic flux of the magnetic field formed within the source resonator 210, based on the layer, and the magnetic field distribution controller 230 may induce the magnetic field to be uniformly distributed in the source resonator 210.

The magnetic field distribution controller 230 may adjust widths of the shielding layers laminated in predetermined positions of the source resonator 210 and the sub-resonator 220, and the magnetic field distribution controller 230 may induce the magnetic field to be uniformly distributed within the source resonator 210. Based on the widths of the shielding layers, a refractive level of the magnetic flux of the magnetic field formed within the source resonator 210 may be changed. Accordingly, the magnetic field distribution controller 230 may adjust the widths of the shielding layers to control the magnetic field to be uniformly distributed within the source resonator 210.

A target device may be located on the source resonator 210 of a pad type. In this example, a gap between the source resonator 210 and the target device may be less than a 2 or 3 centimeters (cm). Accordingly, a parasitic capacitor may be formed between the source resonator 210 and the target device. The parasitic capacitor may influence the resonance frequency of the source resonator 210. The magnetic field distribution controller 230 may adjust widths and thicknesses of the shielding layers laminated in predetermined positions of the source resonator 210 and the sub-resonator 220, and the magnetic field distribution controller 230 may offset a change in the resonance frequency of the source resonator 210 due to the parasitic capacitor formed between the source resonator 210 and the target device.

Figure 3:
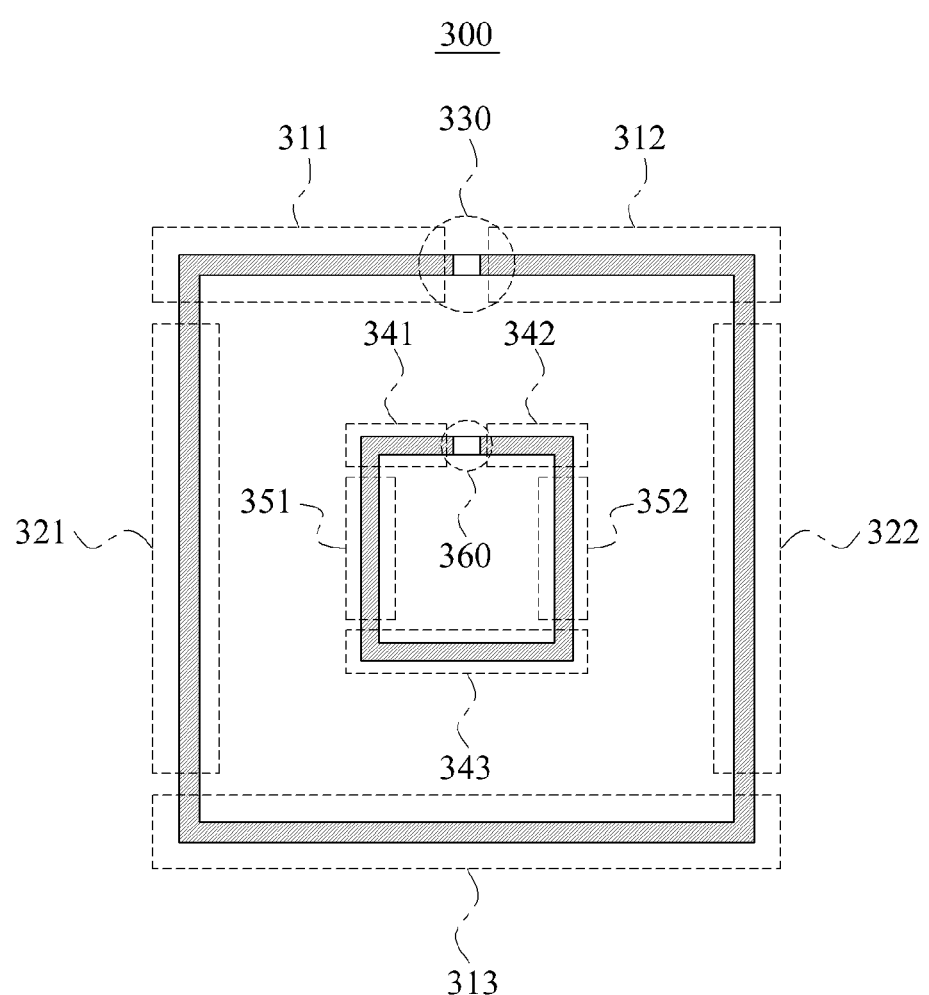
FIG. 3 is a diagram illustrating another example of a wireless power transmitter.

FIG. 3 illustrates an example of a wireless power transmitter 300.

A source resonator may form a magnetic coupling with a target resonator. The source resonator may wirelessly transmit a power to the target device via the magnetic coupling. As illustrated in FIG. 3, the source resonator includes a first transmission line, a first conductor 321, a second conductor 322, and at least one first capacitor 330.

A first capacitor 330 may be inserted in series between a first signal conducting portion 311 and a second signal conducting portion 312 in the first transmission line. An electric field may be confined to be within the first capacitor 330. For example, the first transmission line may include at least one conductor in an upper portion of the first transmission line, and the first transmission line may also include at least one conductor in a lower portion of the first transmission line. Current may flow through the at least one conductor disposed in the upper portion of the first transmission line. The at least one conductor disposed in the lower portion of the first transmission line may be electrically grounded. For example, a conductor disposed in an upper portion of the first transmission line may be separated into the first signal conducting portion 311 and the second signal conducting portion 312. A conductor disposed in a lower portion of the first transmission line may be referred to as a first ground conducting portion 313.

The source resonator of FIG. 3 may have a two-dimensional (2D) structure. The first transmission line may include the first signal conducting portion 311 and the second signal conducting portion 312. The first signal conducting portion 311 and the second signal conducting portion 312 may be located in the upper portion of the first transmission line. In addition, the first transmission line may include the first ground conducting portion 313 in the lower portion of the first transmission line. The first signal conducting portion 311 and the second signal conducting portion 312 may face the first ground conducting portion 313. The current may flow through the first signal conducting portion 311 and the second signal conducting portion 312.

As one aspect, one end of the first signal conducting portion 311 may be shorted to the first conductor 321. One end of the second signal conducting portion 312 may be shorted to the second conductor 322. The other ends of the first signal conducting portion 311 and the second signal conducting portion 312 may both be connected to the first capacitor 330.

Accordingly, the first signal conducting portion 311, the second signal conducting portion 312, the first ground conducting portion 313, and the conductors 321 and 322 may be connected to each other. Thus, the source resonator may have an electrically closed-loop structure. The term "loop structure" may have, for example, a polygonal structure such as a circular structure, a rectangular structure, and the like. "Having a loop structure" may indicate that the circuit is electrically closed.

The first capacitor 330 may be inserted into an intermediate portion of the first transmission line. For example, the first capacitor 330 may be inserted into a space between the first signal conducting portion 311 and the second signal conducting portion 312. The first capacitor 330 may have a shape corresponding to a lumped element, a distributed element, and the like. For example, a distributed capacitor having the shape of the distributed element may include zigzagged conductor lines and a dielectric material having a high permittivity between the zigzagged conductor lines.

In response to the first capacitor 330 being inserted into the first transmission line instead of the space between the first signal conducting portion 311 and the second signal conducting portion 312, the source resonator may have a characteristic of a metamaterial. The metamaterial may indicate a material having a predetermined electrical property that has not been discovered in nature, and thus, the meta material may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials having the right hand rule applied may be referred to as right handed materials (RHMs). As another aspect, the metamaterial having a magnetic permeability or a permittivity absent in nature may be classified into an epsilon negative (ENG) material, an MNG material, a DNG material, a negative refractive index (NRI) material, a left-handed (LH) material, and the like. The classification may be based on a sign of the corresponding permittivity or magnetic permeability.

In response to a capacitance of the first capacitor 330 inserted as the lumped element being appropriately determined, the source resonator may have the characteristic of the metamaterial. The source resonator may have a negative magnetic permeability based on an adjustment of the capacitance of the first capacitor 330. Thus, the source resonator may also be referred to as an MNG resonator. Various criteria may be used to determine the capacitance of the first capacitor 330. For example, the various criteria may include a criterion for enabling the source resonator to have the characteristic of the metamaterial, a criterion for enabling the source resonator to have a negative magnetic permeability in a target frequency, a criterion for enabling the source resonator to have a zeroth order resonance characteristic in the target frequency, and the like. Based on any combination of the aforementioned criteria, the capacitance of the first capacitor 330 may be determined.

The source resonator, also referred to as the MNG resonator, may have a zeroth order resonance characteristic. The zeroth order resonance characteristic may have, as a resonance frequency, a frequency where a propagation constant is "0". Because the source resonator may have the zeroth order resonance characteristic, the resonance frequency may be independent of a physical size of the MNG resonator. The MNG resonator may change the resonance frequency based on an appropriate design of the first capacitor 330. Accordingly, the physical size of the MNG resonator may not be changed.

In a near field, the electric field may be concentrated on the first capacitor 330 inserted into the first transmission line. Accordingly, due to the first capacitor 330, the magnetic field may become dominant in the near field. The MNG resonator may have a relatively high Q-factor using the first capacitor 330 of the lumped element, and thus, an enhancement of an efficiency of power transmission may be possible. For example, the Q-factor may indicate a level of an ohmic loss or a ratio of a reactance with respect to a resistance in the wireless power transmission. The efficiency of the wireless power transmission may increase corresponding to an increase in the Q-factor.

Although not illustrated in FIG. 3, a magnetic core may be provided to pass through the MNG resonator. The magnetic core may increase a power transmission distance.

Referring to FIG. 3, a sub-resonator includes a second transmission line, a third conductor 351, a fourth conductor 352, and at least one second capacitor 360.

The second capacitor 360 may be inserted between a third signal conducting portion 341 and a fourth signal conducting portion 342 in the second transmission line, and an electric field may be confined to be within the second capacitor 360. As an example, The second capacitor 360 may be located in series between a third signal conducting portion 341 and a fourth signal conducting portion 342.

As illustrated in FIG. 3, the sub-resonator may have a 2D structure. The second transmission line may include the third signal conducting portion 341 and the fourth signal conducting portion 342 in an upper portion of the second transmission line. In addition, the second transmission line may include a second ground conducting portion 343 in a lower portion of the second transmission line. The third signal conducting portion 341 and the fourth signal conducting portion 342 may face the second ground conducting portion 343. Current may flow through the third signal conducting portion 341 and the fourth signal conducting portion 342.

As another aspect, one end of the third signal conducting portion 341 may be shorted to the third conductor 351, and the other end of the third signal conducting portion 341 may be connected to the second capacitor 360. One end of the fourth signal conducting portion 342 may be shorted to the fourth conductor 352, and the other end of the fourth signal conducting portion 342 may be connected to the second capacitor 360. Accordingly, the third signal conducting portion 341, the fourth signal conducting portion 342, the second ground conducting portion 343, the third conductor 351, and the fourth conductor 352 may be connected to each other. Thus, the sub-resonator may have an electrically closed-loop structure. The term "loop structure" may refer to, for example, a polygonal structure such as a circular structure, a rectangular structure, and the like.

The second transmission line, the third conductor 351, and the fourth conductor 352 may form, for example, a rectangular loop structure, a circular loop structure, or a crossed loop structure.

A magnetic field distribution controller may adjust a resonance frequency of at least one sub-resonator, based on a value of the second capacitor 360, and a length and width of the second transmission line. Thus, the resonance frequency of the sub-resonator may differ from a resonance frequency of the source resonator by a predetermined value.

The magnetic field distribution controller may adjust the value of the second capacitor 360. For example, in response to the value of the second capacitor 360 being changed, the resonance frequency of the sub-resonator may also be changed. Accordingly, the magnetic field distribution controller may adjust the value of the second capacitor 360 to adjust the resonance frequency of the sub-resonator to be greater than or less than the resonance frequency of the source resonator. The magnetic field distribution controller may adjust the resonance frequency of the sub-resonator to be greater than or less than the resonance frequency of the source resonator, so that a magnetic field formed in the center of the source resonator may have substantially the same strength as a magnetic field formed outside the source resonator.

FIGS. 4 through 8 illustrate examples of resonators. A source resonator included in a wireless power transmitter may have a structure as illustrated in FIGS. 4 through 8.

Figure 4:
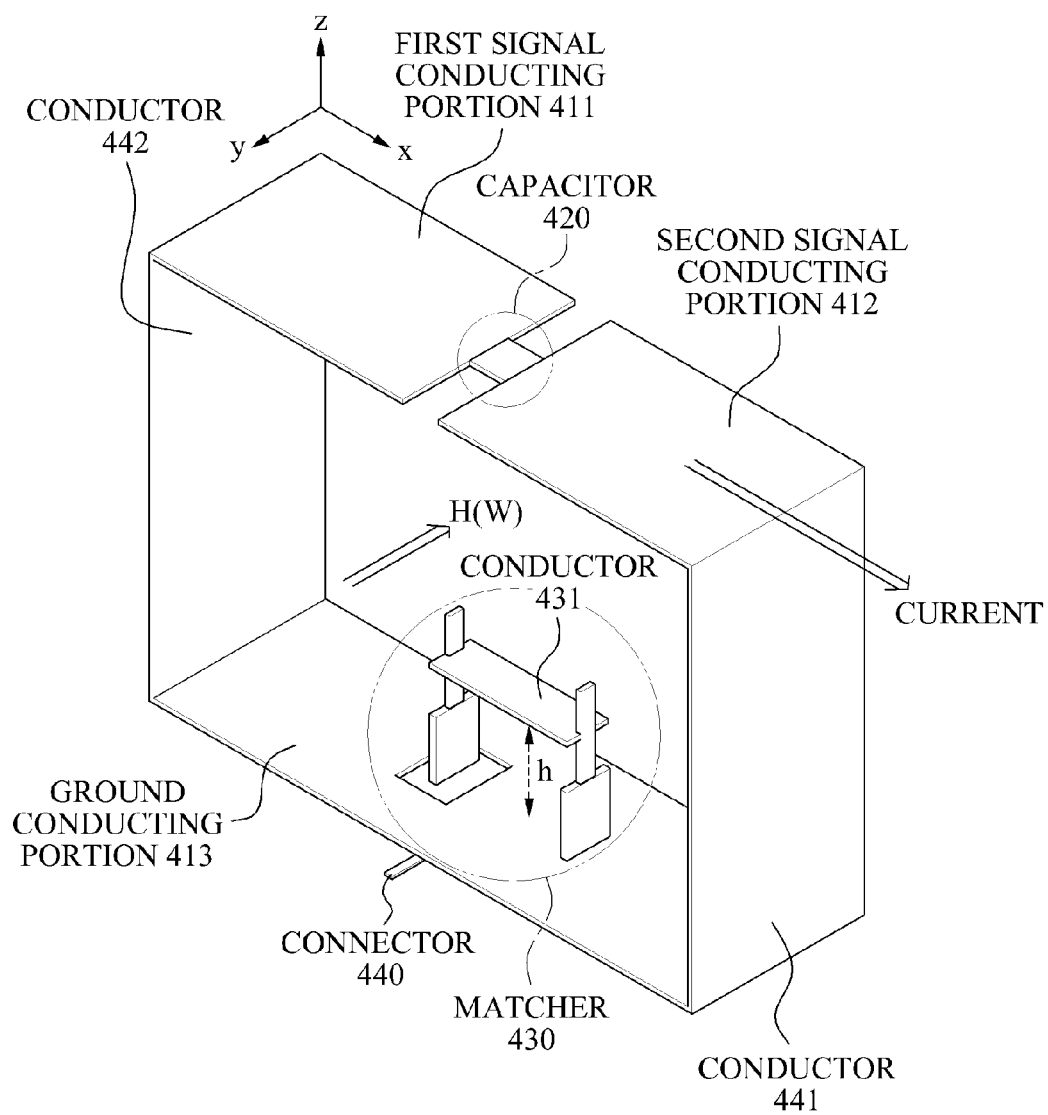
FIGS. 4 through 8 are diagrams illustrating examples of resonators.

FIG. 4 illustrates an example of a resonator 400 having a three-dimensional (3D) structure.

Referring to FIG. 4, the resonator 400 having the 3D structure may include a transmission line and a capacitor 420. The transmission line may include a first signal conducting portion 411, a second signal conducting portion 412, and a ground conducting portion 413. The capacitor 420 may be located in series between the first signal conducting portion 411 and the second signal conducting portion 412 of the transmission link. An electric field may be confined within the capacitor 420.

As illustrated in FIG. 4, the resonator 400 may have the 3D structure. The transmission line may include the first signal conducting portion 411 and the second signal conducting portion 412 in an upper portion of the resonator 400, and the resonator 400 may include a ground conducting portion 413 in a lower portion of the resonator 400. The first signal conducting portion 411 and the second signal conducting portion 412 may face the ground conducting portion 413. For example, current may flow in an x direction through the first signal conducting portion 411 and the second signal conducting portion 412. Due to the current, a magnetic field H(W) may be formed in a −y direction. As another example, unlike the diagram of FIG. 4, the magnetic field H(W) may be formed in a +y direction.

One end of the first signal conducting portion 411 may be shorted to the conductor 442, and the other end of the first signal conducting portion 411 may be connected to the capacitor 420. One end of the second signal conducting portion 412 may be grounded to the conductor 441, and the other end of the second signal conducting portion 412 may be connected to the capacitor 420. Accordingly, the first signal conducting portion 411, the second signal conducting portion 412, the ground conducting portion 413, and the conductors 441 and 442 may be connected to each other. Thus, the resonator 400 may have an electrically closed-loop structure. The term "loop structure" may refer to a polygonal structure such as, for example, a circular structure, a rectangular structure, and the like. "Having a loop structure" may indicate being electrically closed.

As shown in FIG. 4, the capacitor 420 may be inserted between the first signal conducting portion 411 and the second signal conducting portion 412. The capacitor 420 may have a shape of a lumped element, a distributed element, and the like. As an aspect, a distributed capacitor having the shape of the distributed element may include zigzagged conductor lines, and the distributed capacitor may have a dielectric material having a relatively high permittivity located between the zigzagged conductor lines.

The resonator 400, having the capacitor 420 inserted into the transmission line, may have a metamaterial property.

In response to a capacitance of the capacitor inserted as the lumped element being appropriately determined, the resonator 400 may have the characteristic of the metamaterial. Because the resonator 400 may appropriately adjust the capacitance of the capacitor 420 to have a negative magnetic permeability, the resonator 400 may also be referred to as an MNG resonator. Various criteria may be applied to determine the capacitance of the capacitor 420. For example, a criterion may enable the resonator 400 to have the characteristic of the metamaterial, a criterion may enable the resonator 400 to have a negative magnetic permeability in a target frequency, a criterion may enable the resonator 400 to have a zeroth order resonance characteristic in the target frequency, and the like. The capacitance of the capacitor 420 may be determined based on at least one criterion among the aforementioned criteria.

The resonator 400, also referred to as the MNG resonator 400, may have a zeroth order resonance characteristic having, as a resonance frequency, a frequency where a propagation constant is "0". Because the resonator 400 may have the zeroth order resonance characteristic, the resonance frequency may be independent of a physical size of the MNG resonator 400. The MNG resonator 400 may appropriately design the capacitor 420 to change the resonance frequency. Accordingly, the physical size of the MNG resonator 400 may not be changed.

Referring to the MNG resonator 400 of FIG. 4, in a near field, the electric field may be concentrated on the capacitor 420 inserted into the transmission line. Accordingly, the magnetic field may become dominant in the near field due to the capacitor 420. For example, because the MNG resonator 400 having the zeroth-order resonance characteristic may have characteristics similar to a magnetic dipole, the magnetic field may become dominant in the near field. A relatively small amount of the electric field formed due to the insertion of the capacitor 420 may be concentrated on the capacitor 420, and thus, the magnetic field may become further dominant. The MNG resonator 400 may have a relatively high Q-factor using the capacitor 420 of the lumped element. Thus, enhancement of an efficiency of power transmission is possible.

Also, the MNG resonator 400 may include a matcher 430 for impedance matching. The matcher 430 may appropriately adjust the strength of magnetic field of the MNG resonator 400. The matcher 430 may determine an impedance of the MNG resonator 400. Current may flow into and/or out of the MNG resonator 400 via a connector 440 connected to the ground conducting portion 413 or the matcher 430.

For example, as shown in FIG. 4, the matcher 430 may be positioned within the loop of the loop structure of the resonator 400. The matcher 430 may change the physical shape of the matcher 430 to adjust the impedance of the resonator 400. For example, the matcher 430 may include the conductor 431 for the impedance matching in a location separate from the ground conducting portion 413 by a distance h. Adjusting the distance h may change the impedance of the resonator 400.

Although not illustrated in FIG. 4, a controller may control the matcher 430. For example, the physical shape of the matcher 430 may be changed based on a control signal generated by the controller. For example, the control signal may increase or decrease the distance h between the conductor 431 of the matcher 430 and the ground conducting portion 413. Accordingly, the physical shape of the matcher 430 may be changed to adjust the impedance of the resonator 400. The distance h between the conductor 431 of the matcher 430 and the ground conducting portion 413 may be adjusted using a variety of schemes. As one example, the matcher 430 may include a plurality of conductors and the distance h may be adjusted by adaptively activating one of the conductors. As another example, adjusting the physical location of the conductor 431 up and down may adjust the distance h. The distance h may be controlled based on the control signal of the controller. The controller may generate the control signal using various factors.

As shown in FIG. 4, the matcher 430 may be configured as a passive element such as the conductor 431. Depending on examples, the matcher 430 may be configured as an active element. The active element may be a diode, a transistor, and the like. In response to the active element being included in the matcher 430, the active element may be driven based on the control signal generated by the controller, and the impedance of the resonator 400 may be adjusted based on the control signal. For example, a diode may be included in the matcher 430 where the diode is a type of active element. For example, the impedance of the resonator 400 may be adjusted based on whether the state of the diode where the diode is in an ON state or an OFF state.

Although not illustrated in FIG. 4, a magnetic core may be provided to pass through the resonator 400 configured as the MNG resonator. The magnetic core may increase a power transmission distance.

Figure 5:
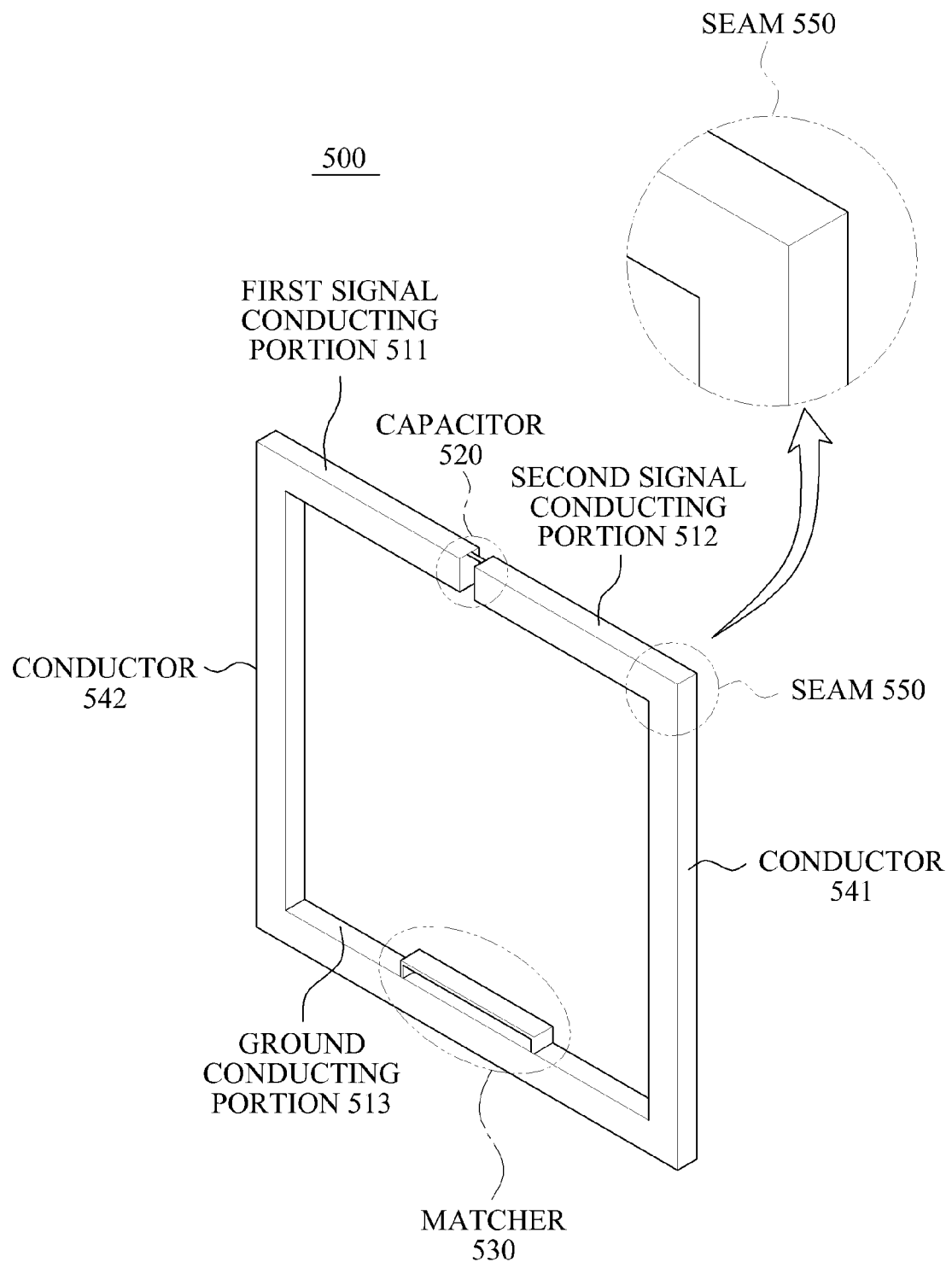

FIG. 5 illustrates an example of a bulky-type resonator 500 for wireless power transmission.

Referring to FIG. 5, a first signal conducting portion 511 and a second signal conducting portion 512 may be integrally formed instead of being separately manufactured and thereafter connected to each other. As another example, the second signal conducting portion 512 and the conductor 541 may be integrally manufactured.

In response to the second signal conducting portion 512 and the conductor 541 being separately manufactured and then connected to each other, a loss of conduction may occur at seam 550. The second signal conducting portion 512 and the conductor 541 may be connected to each other without using a separate seam. In other words, the second signal conducting portion 512 and the conductor 541 may be seamlessly connected to each other. Accordingly, a conductor loss caused by the seam 550 may be decreased. As another example, the second signal conducting portion 512 and a ground conducting portion 513 may be seamlessly and integrally manufactured. As yet another example, the first signal conducting portion 511 and the ground conducting portion 513 may be seamlessly and integrally manufactured.

Referring to FIG. 5, a type of a seamless connection connecting at least two partitions into an integrated form may be referred to as a bulky type.

Figure 6:
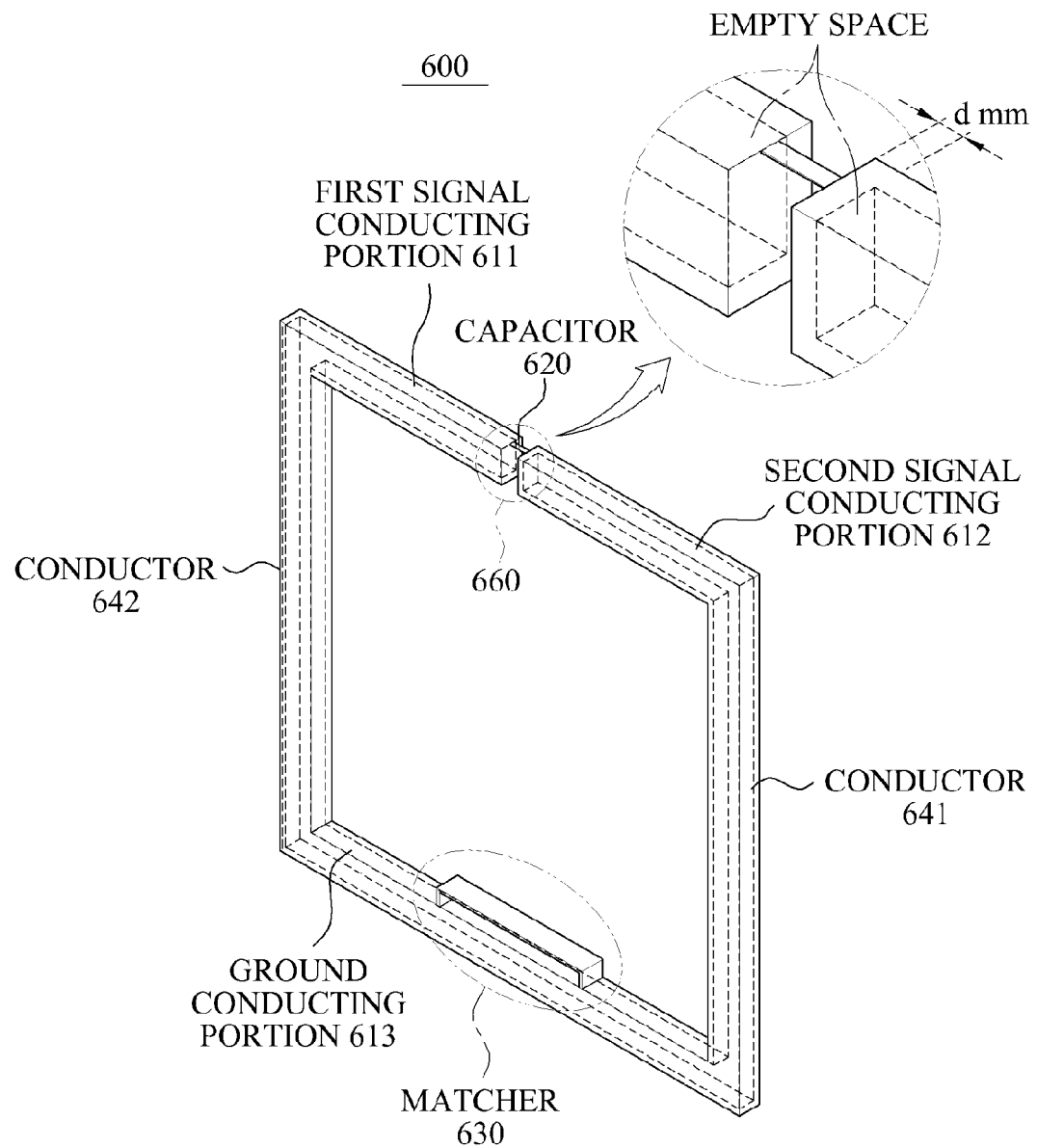

FIG. 6 illustrates an example of a hollow-type resonator 600 for wireless power transmission.

Referring to FIG. 6, each of a first signal conducting portion 611, a second signal conducting portion 612, a ground conducting portion 613, and conductors 641 and 642 of the hollow type resonator 600 include an empty or hollow space inside.

For a given resonance frequency, an active current may be modeled to flow in only a portion of the first signal conducting portion 611 instead of the entire first signal conducting portion 611, the active current may be modeled to flow in only a portion of the second signal conducting portion 612 instead of the entire second signal conducting portion 612, the active current may be modeled to flow in only a portion of the ground conducting portion 613 instead of the entire ground conducting portion 613, active current may be modeled to flow in only a portion of the conductors 641 and 642 instead of the entire conductors 641 and 642, or in any combination thereof. For example, in response to a depth of each of the first signal conducting portion 611, the second signal conducting portion 612, the ground conducting portion 613, and the conductors 641 and 642 being significantly deeper than a corresponding skin depth in the given resonance frequency, the hollow type resonator 600 may be ineffective. As a result, the significantly deeper depth may increase a weight or manufacturing costs of the resonator 600.

Accordingly, for the given resonance frequency, the depth of each of the first signal conducting portion 611, the second signal conducting portion 612, the ground conducting portion 613, and the conductors 641 and 642 may be determined based on the corresponding skin depth of each of the first signal conducting portion 611, the second signal conducting portion 612, the ground conducting portion 613, and the conductors 641 and 642. In response to each of the first signal conducting portion 611, the second signal conducting portion 612, the ground conducting portion 613, and the conductors 641 and 642 having an appropriate depth deeper than a corresponding skin depth, the resonator 600 may become lighter in weight, and manufacturing costs of the resonator 600 may also decrease.

For example, as shown in FIG. 6, the depth of the second signal conducting portion 612 may correspond with "d" mm and d may be calculated according to $$d = \frac{1}{\sqrt{\pi f \mu \sigma}}.$$

In this example, f corresponds with a frequency, $\mu$ corresponds with a magnetic permeability, and $\sigma$ corresponds with a conductor constant. For example, in response to the first signal conducting portion 611, the second signal conducting portion 612, the ground conducting portion 613, and the conductors 641 and 642 being made of copper and having a conductivity of $5.8 \times 10^7$ siemens per meter (S·m$^{-1}$), the skin depth may be about 0.6 mm with respect to 6 kHz of the resonance frequency and the skin depth may be about 0.006 mm with respect to 60 MHz of the resonance frequency.

Figure 7:
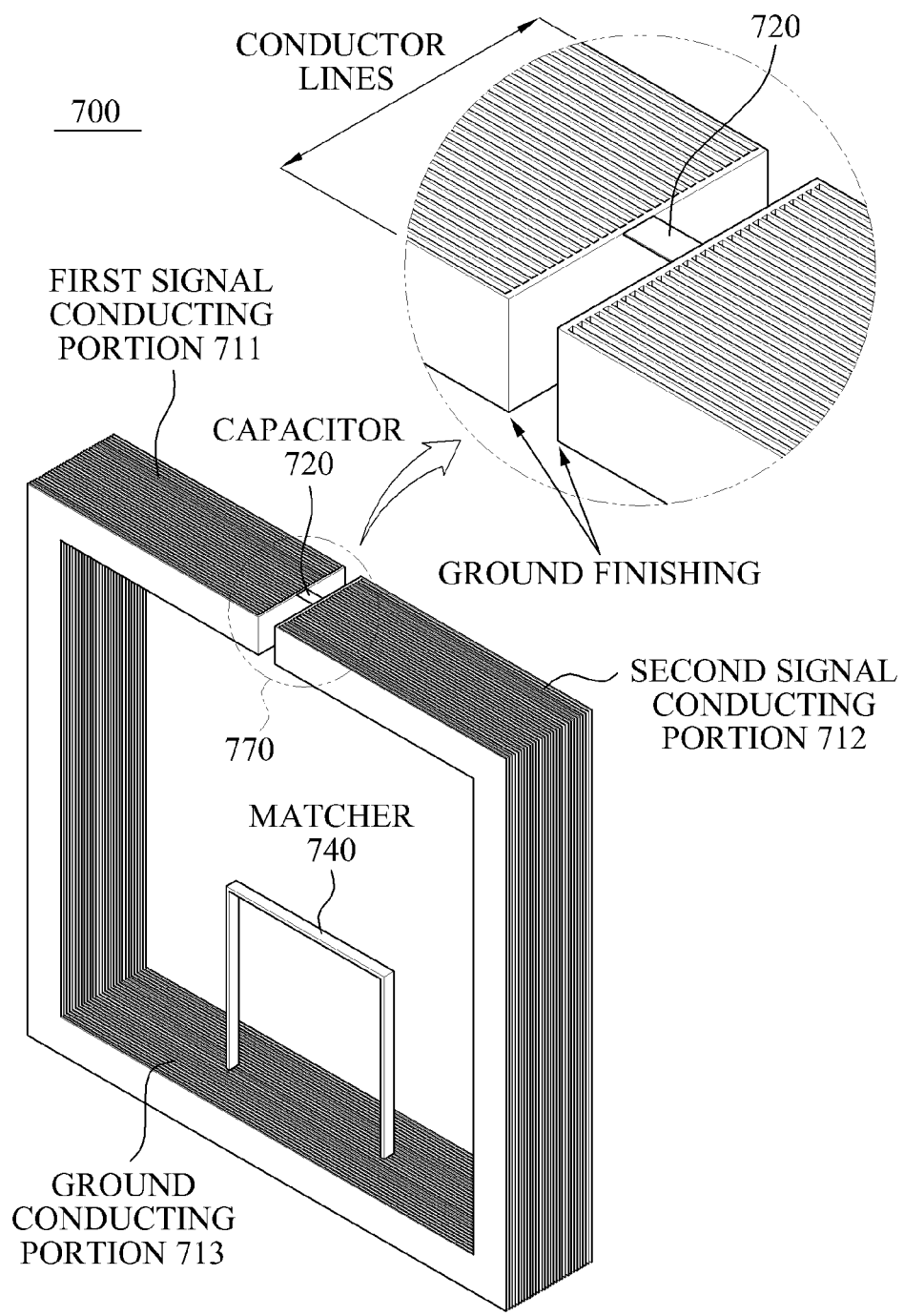

FIG. 7 illustrates a resonator 700 for wireless power transmission using a parallel-sheet.

Referring to FIG. 7, the parallel-sheet may be applied to each of a first signal conducting portion 711 and a second signal conducting portion 712 included in the resonator 700.

Each of the first signal conducting portion 711 and the second signal conducting portion 712 may have a resistance. Thus, first signal conducting portion 711 and the second signal conducting portion 712 may not be a perfect conductor. Due to the resistance, an ohmic loss may occur, which may decrease a Q-factor and also a coupling effect.

By applying the parallel-sheet to each of the first signal conducting portion 711 and the second signal conducting portion 712, a decrease in the ohmic loss, and an increase in the Q-factor and the coupling effect may be possible. Referring to a portion 770 indicated by a circle, in response to the parallel-sheet being applied, each of the first signal conducting portion 711 and the second signal conducting portion 712 may include a plurality of conductor lines. For example, the plurality of conductor lines may be disposed in parallel, and may be shorted at an end portion of each of the first signal conducting portion 711 and the second signal conducting portion 712.

As described above, in response to the parallel-sheet being applied to each of the first signal conducting portion 711 and the second signal conducting portion 712, the plurality of conductor lines may be disposed in parallel. Accordingly, a sum of resistances having the conductor lines may be decreased. Accordingly, the resistance loss may decrease, and the Q-factor and the coupling effect may increase.

Figure 8:
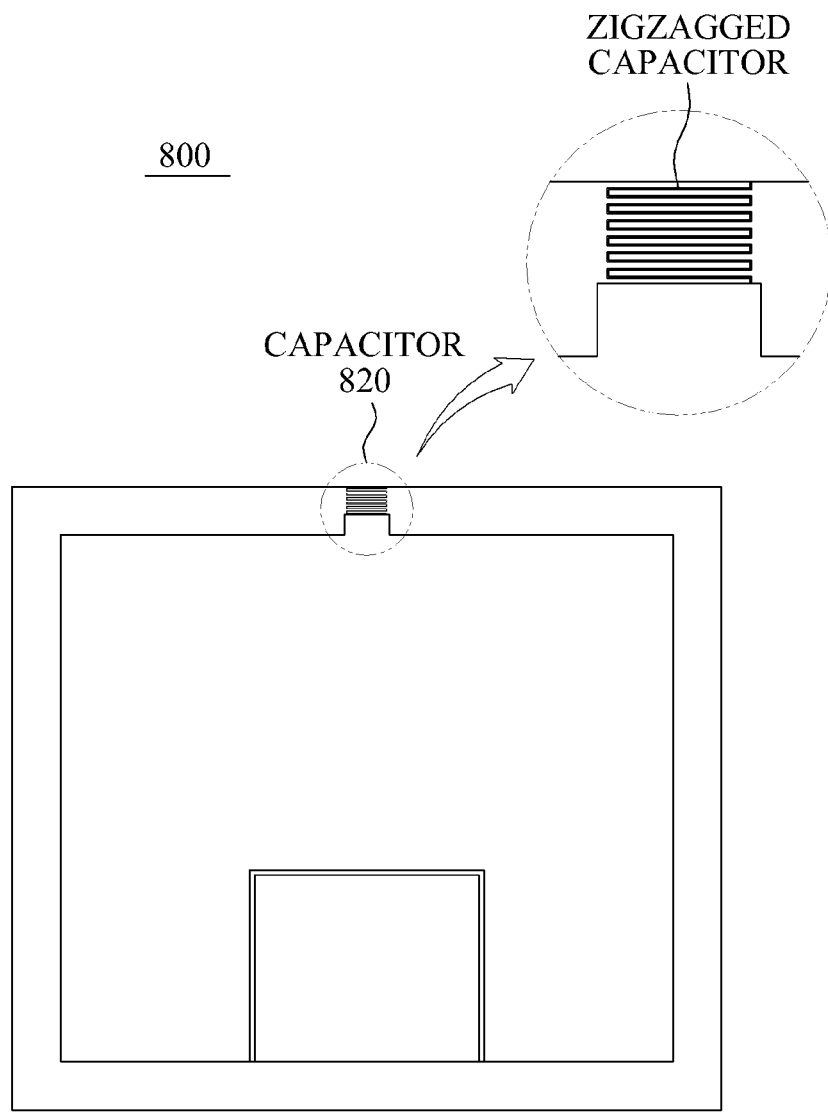

FIG. 8 illustrates an example of a resonator 800 for wireless power transmission that includes a distributed capacitor.

Referring to FIG. 8, a capacitor 820 may be included in the resonator 800 for the wireless power transmission. The capacitor 820 may be a distributed capacitor. A capacitor as a lumped element may have a relatively high equivalent series resistance (ESR). A variety of schemes have been proposed to decrease the ESR contained in the capacitor of the lumped element. According to an example, by using the capacitor 820 as a distributed element, a decrease in the ESR is possible. A loss caused by the ESR may decrease a Q-factor and a coupling effect.

As shown in FIG. 8, the capacitor 820 may have a zigzagged structure. The capacitor 820 may be the distributed element. For example, the capacitor 820 as the distributed element may be configured as a conductive line and a conductor having the zigzagged structure.

As shown in FIG. 8, employing the capacitor 820 as the distributed element may cause a decrease in the loss occurring due to the ESR. In addition, by disposing a plurality of capacitors as lumped elements, a decrease in the loss occurring due to the ESR may be possible. Because a resistance of each of the capacitors as the lumped elements decreases through a parallel connection, active resistances of parallel-connected capacitors as the lumped elements may also decrease. Thus, the loss occurring due to the ESR may decrease. For example, employing ten capacitors of 1 pF instead of using a single capacitor of 10 pF, may decrease the loss occurring due to the ESR.

Figure 9:
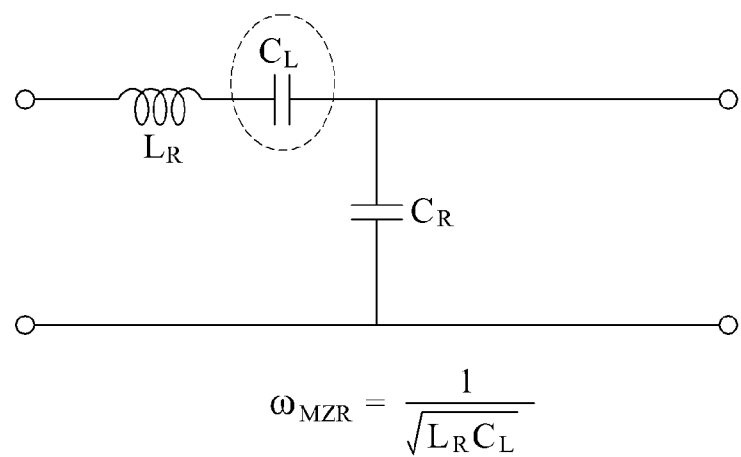
FIG. 9 is a diagram illustrating an example of an equivalent circuit of a resonator of FIG. 3.

FIG. 9 illustrates an example of an equivalent circuit of the resonator for wireless power transmission of FIG. 3.

The resonator of FIG. 3 may be modeled to the equivalent circuit of FIG. 9. In the equivalent circuit of FIG. 9, $C_L$ may correspond to a capacitor that is inserted in the form of a lumped element at approximately the middle of one of the transmission lines of FIG. 3.

In this example, the resonator of FIG. 3 may have a zeroth resonance characteristic. For example, in response to a propagation constant being "0", the resonator of FIG. 3 may have $\omega_{MZR}$ as a resonance frequency. The resonance frequency $\omega_{MZR}$ may be expressed by Equation 1.

$$\omega_{MZR} = \frac{1}{\sqrt{L_R C_L}} \quad \text{[Equation 1]}$$

In Equation 1, MZR correspond to a Mµ zero resonator.

Referring to Equation 1, the resonance frequency $\omega_{MZR}$ of the resonator of FIG. 3 may be determined by $L_R/C_L$. A physical size of the resonator of FIG. 3 and the resonance frequency $\omega_{MZR}$ may be independent of each other. Because the physical sizes are independent with respect to each other, the physical size of the resonator of FIG. 3 may be sufficiently reduced.

Figure 10:
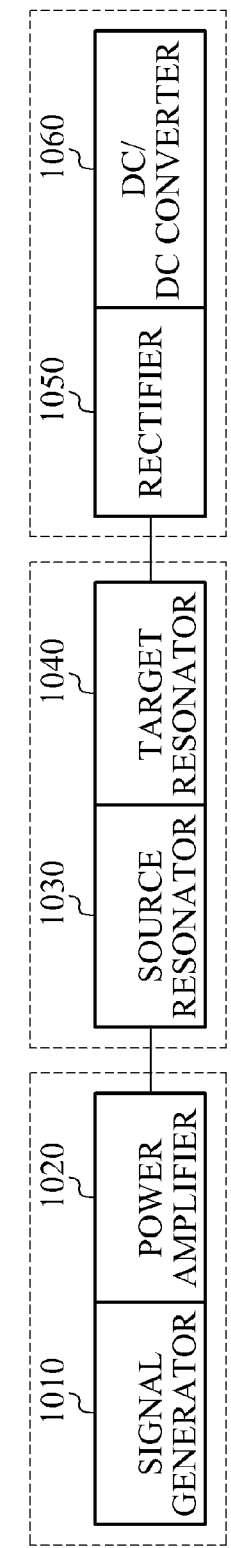
FIG. 10 is a diagram illustrating an example of a configuration of a wireless power receiving and transmitting system.

FIG. 10 illustrates an example of a configuration of a wireless power receiving and transmitting system 1000.

The wireless power receiving and transmitting system 1000 may include a transmission apparatus, and a reception apparatus.

The transmission apparatus may include a signal generator 1010, a power amplifier 1020, and a source resonator 1030. An example of the transmission apparatus may be a wireless power transmitter.

The reception apparatus may include a target resonator 1040, a rectifier 1050, and a DC/DC converter 1060. An example of the reception apparatus may be a wireless power receiver.

The transmission apparatus may refer to a system that wirelessly provides a power to the reception apparatus. The signal generator 1010 may generate a signal used to transmit wireless power. The generated signal may be sent to the power amplifier 1020.

The power amplifier 1020 may amplify the generated signal to be suitable for transmission through the source resonator 1030. The power amplifier 1020 may amplify the signal, and the signal may be provided to the source resonator 1030.

The source resonator 1030 may wirelessly transmit the amplified signal to the reception apparatus through resonance.

In other words, power may be transmitted through resonance between the source resonator 1030 of the transmission apparatus, and the target resonator 1040 of the reception apparatus.

The reception apparatus may refer to a system that wirelessly receives a power from the transmission apparatus, and the reception apparatus may use the received power.

The reception apparatus may be implemented for a low power application using a 10 power equal to or less than 10 W.

The target resonator 1040 may receive a wirelessly transmitted signal from the source resonator 1030. In other words, the target resonator 1040 may receive a power wirelessly.

The target resonator 1040 may be provide the received signal to the rectifier 1050.

The rectifier 1050 may rectify the received signal. In other words, the received signal may be the received power.

The DC/DC converter 1060 may convert the rectified signal. As an example, the DC/DC converter 1060 may convert the power rectified by the rectifier 1050. The converted power may have, for example, a voltage suitable to be provided to a load connected to the receiver.

The DC/DC converter 1060 may be implemented, for example, as a buck converter. In other words, the buck converter may be a switching regulator.

For commercialization of wireless power transmission, the total efficiency of the wireless power receiving and transmitting system 1000 may be at least 60%, as illustrated in Table 1 below. The total efficiency may be obtained by summing up an efficiency of the signal generator 1010, an efficiency of the power amplifier 1020, an efficiency of power transfer from the source resonator 1030 to the target resonator 1040 (namely, an efficiency of power transfer from a resonator to a resonator), an efficiency of the rectifier 1050, and an efficiency of the DC/DC converter 1060.

TABLE 1

| Efficiency of the signal generator 1010 + Efficiency of the power amplifier 1020 | Efficiency of power transfer from the source resonator 1030 to the target resonator 1040 | Efficiency of the rectifier 1050 + Efficiency of the DC/DC converter 1060 | Total |
|---|---|---|---|
| 85% | 90% | 80% | >60% |

To achieve the total efficiency, the sum of the efficiency of the signal generator 1010 and the efficiency of the power amplifier 1020, the efficiency of power transfer from the source resonator 1030 to the target resonator 1040, and the sum of the efficiency of the rectifier 1050 and the efficiency of the DC/DC converter 1060 may be respectively at least 85%, 90%, and 80%.

Typically, for commercialization of wireless power transmission, the DC/DC converter 1060 may have an efficiency of about 92%. Accordingly, to enable the sum of the efficiency of the rectifier 1050 and the efficiency of the DC/DC converter 1060 to reach at least 80%, the efficiency of the rectifier 1050 may be at least 90%.

To obtain a rectification operation having an efficiency of at least 90% in an RF band greater than 1 MHz, a Schottky diode may be used as a basic diode of the rectifier 1050.

The Schottky diode may have a low voltage drop. Additionally, a majority carrier may carry an electric charge of the Schottky diode. In other words, since the majority carrier may not accumulate the electric charge, the Schottky diode may have a high speed.

The Schottky diode having the low voltage drop may be used to configure a rectifier circuit of a wireless power transmission employing a resonance scheme using an RF band of 1 MHz to 15 MHz.

Figure 11:
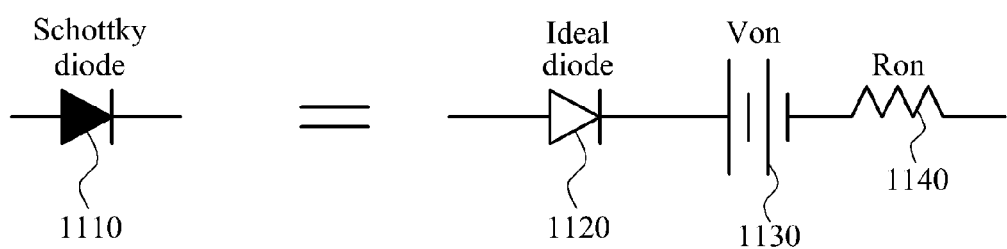
FIG. 11 is a diagram illustrating an example of an equivalent model of a Schottky diode.

FIG. 11 illustrates an example of an equivalent model of a Schottky diode.

A Schottky diode 1110 may include an ideal diode 1120, a voltage $V_{on}$ 1130, and a resistance $R_{on}$ 1140. The voltage $V_{on}$ 1130 may be used in response to the Schottky diode 1110 being turned on, and a characteristic of the resistance $R_{on}$ 1140 may be changed depending on a flowing current.

In the Schottky diode 1110, the ideal diode 1120, the voltage $V_{on}$ 1130, and the resistance $R_{on}$ 1140 may be connected in series.

Schottky diodes may have various performances based on manufacturers or manufacturing processes. Accordingly, to design a rectifier current with a high efficiency, selecting a Schottky diode having a voltage drop that is equal to or less than a predetermined value at a predetermined current level may be desired.

Figure 12A:
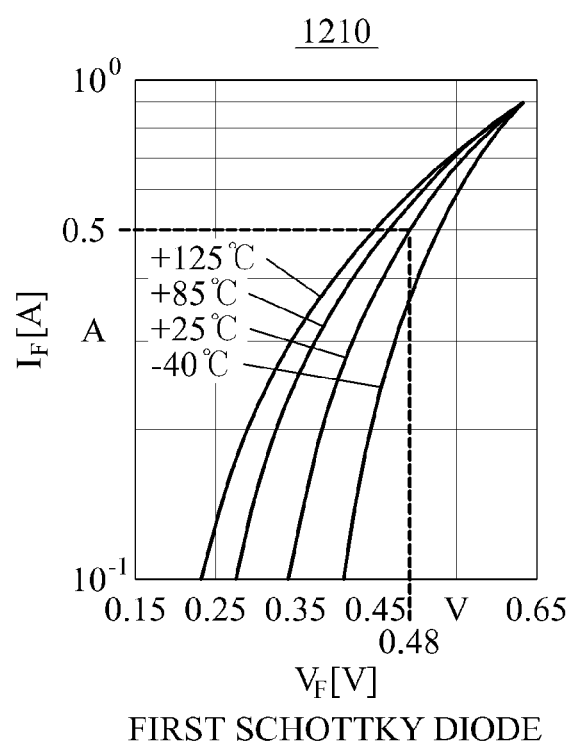
FIGS. 12A and 12B are graphs illustrating examples of a current-to-voltage characteristic of a Schottky diode.
Figure 12B:
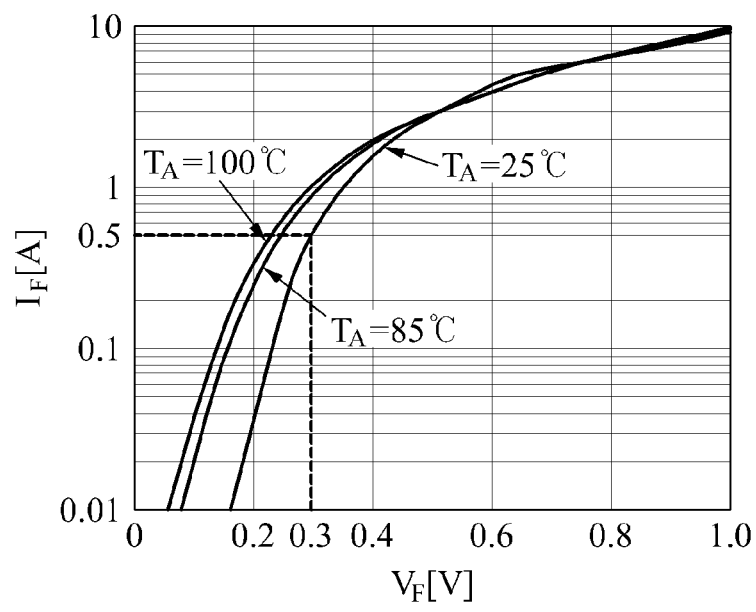

FIGS. 12A and 12B illustrate examples of a current-to-voltage characteristic of a Schottky diode.

In FIGS. 12A and 12B, $V_F$ [V] may correspond with a forward voltage in volts (V).

Additionally, $I_F$ [A] may correspond with a forward current in amperes (A).

$T_A$ may relate to a temperature, for example, a room temperature.

A first graph 1210 of FIG. 12A may may relate to a first Schottky diode. A second graph 1220 of FIG. 12B may may relate to a second Schottky diode. The first Schottky diode and the second Schottky diode may be produced by different manufacturers or produced by different processes.

The first Schottky diode, and the second Schottky diode may be used in wireless power transmission to a mobile.

As illustrated in the first graph 1210 and the second graph 1220, a voltage drop may increase corresponding to an increase in current.

As an example, a current of 0.5 A may flow in the first Schottky diode, correspondingly, a voltage drop of the first Schottky diode may relate to 0.48 V, as illustrated in the first graph 1210.

In another example, a current of 0.5 A may flow in the second Schottky diode, correspondingly, a voltage drop of the second Schottky diode may relate to 0.3 V, as illustrated in the second graph 1220.

Figure 13:
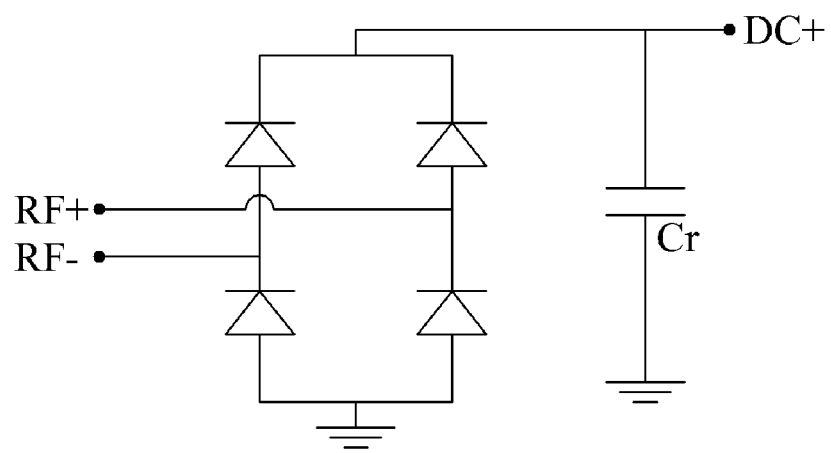
FIG. 13 is a diagram illustrating an example of a full-bridge diode rectifier circuit.

FIG. 13 illustrates an example of a full-bridge diode rectifier circuit.

In the full-bridge diode rectifier circuit, a single path may pass through two diodes. In other words, a current may pass through the two diodes in the single path.

In an example, a rectifier may be configured to use the first Schottky diode of FIG. 12A, in response to a current of 0.5 A flowing in the rectifier, a voltage drop may correspond to 0.96 V (2×0.48=0.96V). Accordingly, the first Schottky diode (0.96 V×0.5 A=0.48 W) may consume a power of 0.48 W.

Assuming that a power of 2.5 W is consumed in a load, in response to a reception apparatus having an efficiency of 80%, an RF power of 3.125 W may be input (2.5÷0.8=3.125 W).

In this example, an efficiency $\eta_{(a)rectifier}$ of a full-bridge diode rectifier may be obtained using the following Equation 2:

$$\therefore \eta_{(a)rectifier} = \frac{|P_{RF}| - P_{2 \times Drop}}{|P_{RF}|} = \frac{3.125 - 0.48}{3.125} = 84.6\% \quad \text{[Equation 2]}$$

In Equation 2, $P_{RF}$ corresponds to an input RF power, and $P_{2 \times Drop}$ corresponds to a power consumed in a diode.

In another example, a rectifier may use the second Schottky diode of FIG. 12B. In response to a current of 0.5 A flowing in the rectifier, a voltage drop may correspond to 0.6 V (2×0.3=0.6V). Accordingly, the second Schottky diode (0.6 V×0.5 A=0.3 W) may consume a power of 0.3 W.

Assuming that a power of 2.5 W is consumed in a load, in response to a reception apparatus having an efficiency of 80%, an RF power of 3.125 W may be input (2.5÷0.8=3.125 W).

In this example, an efficiency $\eta_{(b)rectifier}$ of a full-bridge diode rectifier may be determined using the following Equation 3:

$$\therefore \eta_{(b)rectifier} = \frac{|P_{RF}| - P_{2 \times Drop}}{|P_{RF}|} = \frac{3.125 - 0.3}{3.125} = 90.4\% \quad \text{[Equation 3]}$$

To enable the efficiency of the rectifier 1050 to reach at least 90%, a Schottky diode in which a voltage drop is equal to or less than 0.3V in response to a current of 0.5 A flowing may be desired to be used. As another aspect, few Schottky diodes may have a small size and low cost while having a voltage drop that is equal to or less than 0.3V in response to a current of 0.5 A flowing.

Thus, a rectifier circuit having a voltage drop performance improved using a dual diode may be used. The rectifier circuit may include a Schottky diode rectifier.

Figure 14:
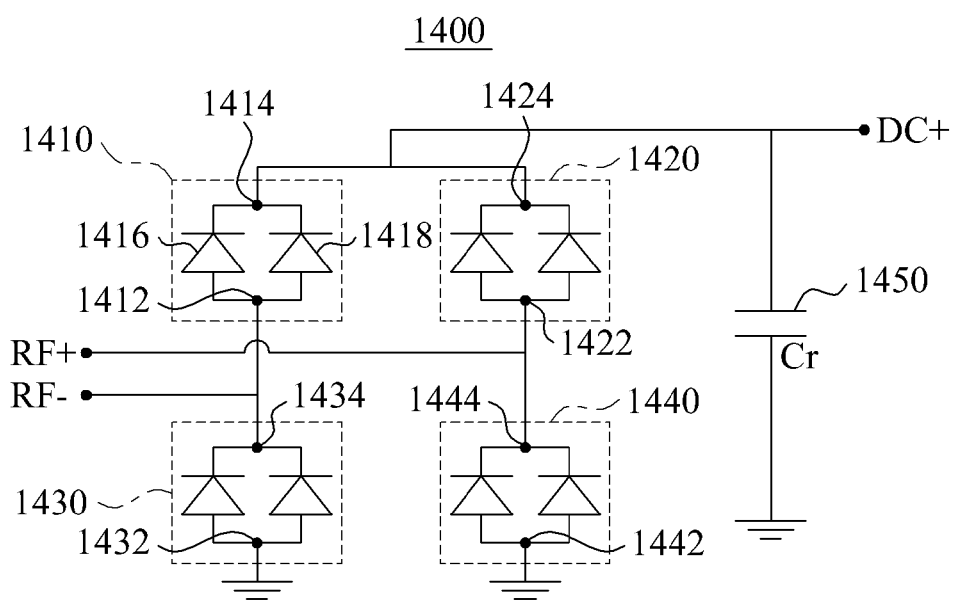
FIG. 14 is a diagram illustrating an example of a structure of a dual diode full-bridge rectifier.

FIG. 14 illustrates an example of a structure of a dual diode full-bridge rectifier 1400.

The dual diode full-bridge rectifier 1400 may be, for example, the rectifier 1050 of FIG. 10.

The rectifier 1050, for example the dual diode full-bridge rectifier 1400, may receive the power from the target resonator 1040 via a positive RF port (RF+) and a negative RF port (RF−).

The target resonator 1040 may output differential signals referred to as RF+ and RF−. In other words, RF+ and RF− may indicate differential input signals. RF+ may be a positive-phase signal, and RF− may be a negative-phase signal.

The rectifier 1050 may rectify a signal referred to as a positive DC port (DC+), and the positive DC port (DC+) may be output from the rectifier 1050.

The dual diode full-bridge rectifier 1400 may include a first rectification unit 1410, a second rectification unit 1420, a third rectification unit 1430, a fourth rectification unit 1440, and a capacitor 1450.

An anode 1412 and a cathode 1414 of the first rectification unit 1410 may be connected to RF− and DC+, respectively.

An anode 1422 and a cathode 1424 of the second rectification unit 1420 may be connected to RF+ and DC+, respectively.

An anode 1432 and a cathode 1434 of the third rectification unit 1430 may be connected to a ground and RF−, respectively.

An anode 1442 and a cathode 1444 of the fourth rectification unit 1440 may be connected to the ground and RF+, respectively.

The capacitor 1450 may be connected to DC+ and the ground. As an aspect, one end of the capacitor 1450 may be connected to DC+, and another end of the capacitor 1450 may be connected to the ground.

Each of the first rectification unit 1410, the second rectification unit 1420, the third rectification unit 1430, and the fourth rectification unit 1440 may include two Schottky diodes. The two Schottky diodes may be connected in parallel. For example, an anode of each of two Schottky diodes may be connected to an anode of a rectification unit, and a cathode of each of the two Schottky diodes may be connected to a cathode of the rectification unit.

In a dual diode mode, diodes, for example two Schottky diodes, may be used in parallel, and the diodes may enable current to pass through two paths, thereby reducing a voltage drop.

As illustrated in FIG. 14, the first rectification unit 1410 may include, for example, two Schottky diodes 1416 and 1418. In other words, a number of Schottky diodes in each rectification unit may be two.

Additionally, the first rectification unit 1410, the second rectification unit 1420, the third rectification unit 1430, and the fourth rectification unit 1440 each may include a plurality of Schottky diodes that are connected in parallel.

Figure 15A:
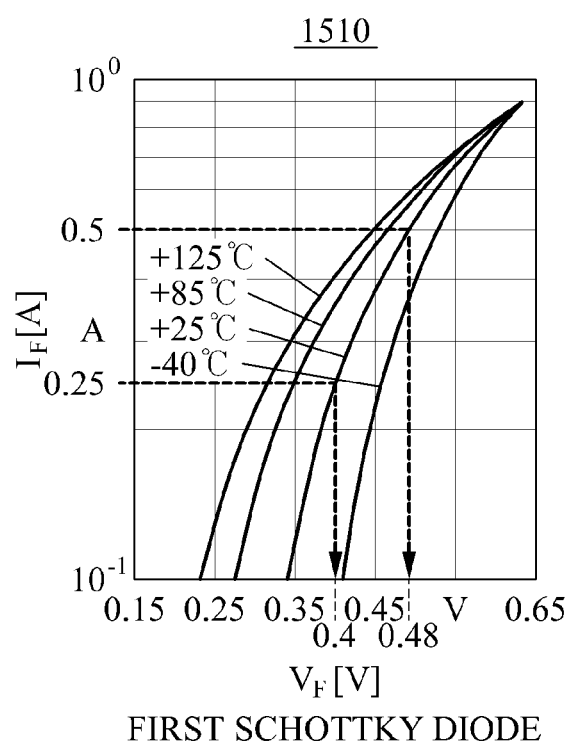
FIGS. 15A and 15B are graphs illustrating examples of current-to-voltage curves indicating a voltage drop of the dual diode full-bridge rectifier of FIG. 14.
Figure 15B:
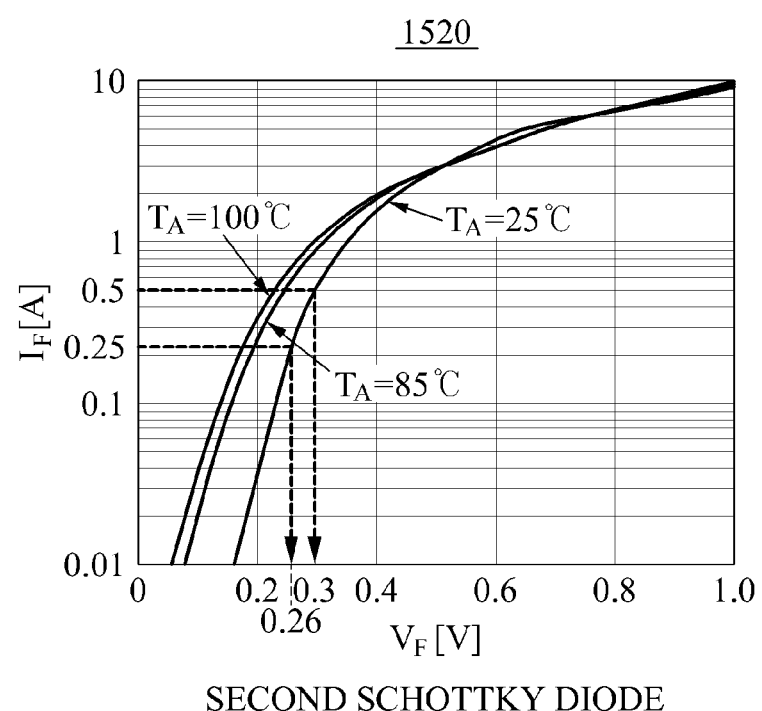

FIGS. 15A and 15B illustrate examples of a current-to-voltage curve indicating a voltage drop of the dual diode full-bridge rectifier 1400 of FIG. 14.

As illustrated in a first graph 1510 of FIG. 15A, in response to a current of 0.5 A flowing in a first Schottky diode, a voltage drop of the first Schottky diode may correspond to 0.48 V. For example, in response to two first Schottky diodes being used in parallel, a current of 0.25 A may flow in each of the two first Schottky diodes. In this example, a voltage drop of a dual diode may correspond to 0.4 V.

In the dual diode full-bridge rectifier 1400, a single path may pass through two diodes in series. Accordingly, a total voltage drop may correspond to 0.8 V (2×0.4=0.8 V).

Thus, a power of 0.4 W may be consumed in the two first Schottky diodes (0.8 V×0.5 A=0.4 W).

As an example, a power of 2.5 W may be consumed in a load. In response to a reception apparatus having an efficiency of 80%, an RF power of 3.125 W may be input (2.5÷0.8=3.125 W).

Accordingly, an efficiency $\eta_{(a)rectifier2}$ of the dual diode full-bridge rectifier 1400 may occur based on the following Equation 4:

$$\therefore \eta_{(a)rectifier2} = \frac{|P_{RF}| - P_{2 \times Drop}}{|P_{RF}|} = \frac{3.125 - 0.4}{3.125} = 87.2\% \quad \text{[Equation 4]}$$

Additionally, as illustrated in a second graph 1520 of FIG. 15B, in response to a current of 0.5 A flowing in a second Schottky diode, a voltage drop of the second Schottky diode may correspond to 0.3 V. For example, in response to two second Schottky diodes being used in parallel, a current of 0.25 A may flow in each of the two second Schottky diodes. In this example, a voltage drop of a dual diode may correspond to 0.26 V.

In the dual diode full-bridge rectifier 1400, a single path may pass through two diodes in series. Accordingly, a total voltage drop may correspond to 0.52 V (2×0.26=0.52 V).

Accordingly, a power of 0.26 W may be consumed in the two second Schottky diodes (0.52 V×0.5 A=0.26 W).

A power of 2.5 W may be consumed in a load. In response to a reception apparatus having an efficiency of 80%, an RF power of 3.125 W may be input (2.5÷0.8=3.125 W).

Accordingly, an efficiency $\eta_{(b)rectifier2}$ of the dual diode full-bridge rectifier 1400 may be obtained using the following Equation 5:

$$\therefore \eta_{(b)rectifier2} = \frac{|P_{RF}| - P_{2 \times Drop}}{|P_{RF}|} = \frac{3.125 - 0.26}{3.125} = 91.6\% \quad \text{[Equation 5]}$$

Thus, the efficiency of the rectifier 1050 may be increased by 2% to 3%, using the dual diode.

Additionally, since Schottky diodes are used in parallel, an amount of current flowing in each of the diodes may be reduced to half. Accordingly, using diodes that are connected in parallel may double an allowable current amount of a diode, and using diodes that are connected in parallel may also contribute to ensuring a stability and reliability of an operation of a rectifier.

Thus, an improvement in efficiency of a rectifier itself by using a dual diode in wireless power transmission, without replacement of a diode, and an improvement in overall system efficiency are possible.

Figure 16A:
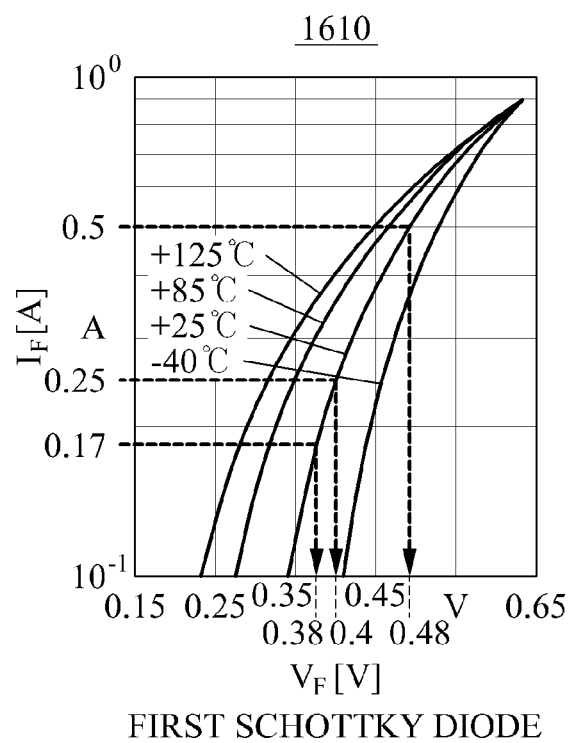

FIGS. 16A and 16B illustrate examples of a current-to-voltage curve indicating a voltage drop of a full-bridge rectifier in which three Schottky diodes are used in parallel.

As an example, FIGS. 16A and 16B illustrate a voltage drop in which a rectification unit is formed with three diodes, instead of two diodes of the dual diode full-bridge rectifier 1400 of FIG. 14.

As illustrated in a first graph 1610 of FIG. 16A, in response to a current of 0.5 A flowing in a first Schottky diode, a voltage drop of the first Schottky diode corresponds to 0.48V. For example, in response to three first Schottky diodes being used in parallel, a current of 0.17 A may flow in each of the three first Schottky diodes. In this example, a voltage drop may correspond to 0.38 V.

An efficiency $\eta_{(a)rectifier3}$ of a rectifier may be obtained using the following Equation 6:

$$\therefore \eta_{(a)rectifier3} = \frac{|P_{RF}| - P_{2 \times Drop}}{|P_{RF}|} = \frac{3.125 - 0.38}{3.125} = 87.8\% \quad \text{[Equation 6]}$$

As illustrated in a second graph 1620 of FIG. 16B, in response to a current of 0.5 A flowing in a second Schottky diode, a voltage drop of the second Schottky diode corresponds to 0.3V. For example, in response to three second Schottky diodes being used in parallel, a current of 0.17 A may flow in each of the three second Schottky diodes. In this example, a voltage drop may correspond to 0.25 V.

An efficiency $\eta_{(b)rectifier3}$ of a rectifier may be obtained using the following Equation 7:

$$\therefore \eta_{(b)rectifier3} = \frac{|P_{RF}| - P_{2 \times Drop}}{|P_{RF}|} = \frac{3.125 - 0.25}{3.125} = 92\% \quad \text{[Equation 7]}$$

In other words, in response to three diodes being used in parallel in a rectifier, an efficiency of the rectifier may be increased by 0.4% to 0.6%, compared to a rectifier employing a dual diode.

Figure 17:
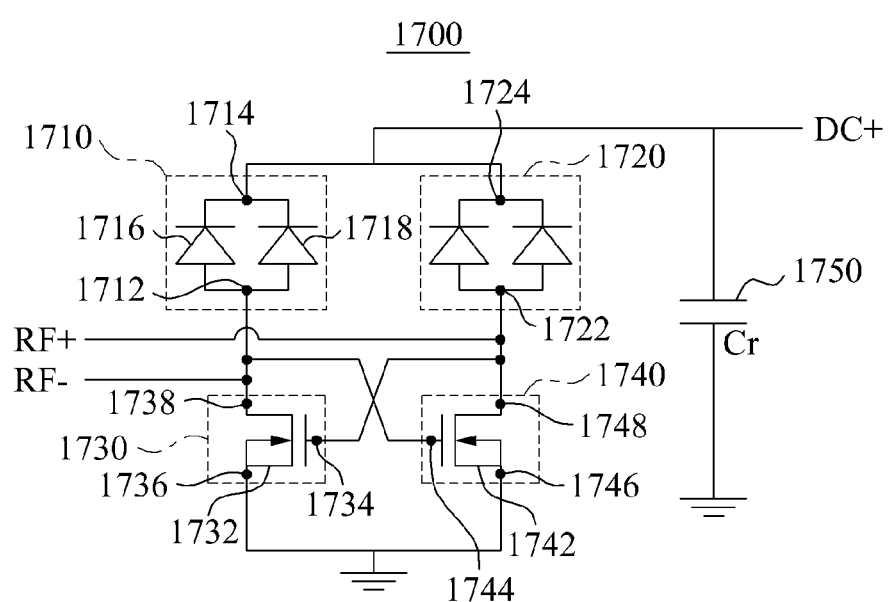
FIG. 17 is a diagram illustrating an example of a structure of a dual diode cross-coupled transistor (TR) rectifier.

FIG. 17 illustrates an example of a structure of a dual diode cross-coupled transistor (TR) rectifier 1700.

The dual diode cross-coupled TR rectifier 1700 may be, for example, the rectifier 1050 of FIG. 10.

To reduce an influence of a voltage drop of a diode, the dual diode cross-coupled TR rectifier 1700 may be configured using N-metal-oxide-semiconductor field-effect transistors (N-MOSFETs), instead of diodes of the third rectification unit 1430 and the fourth rectification unit 1440 in the dual diode full-bridge rectifier 1400 of FIG. 14.

The dual diode cross-coupled TR rectifier 1700 may include a first rectification unit 1710, a second rectification unit 1720, a third rectification unit 1730, a fourth rectification unit 1740, and a capacitor 1750.

An anode 1712 and a cathode 1714 of the first rectification unit 1710 may be connected to RF– and DC+, respectively.

An anode 1722 and a cathode 1724 of the second rectification unit 1720 may be connected to RF+ and DC+, respectively.

The capacitor 1750 may be connected to DC+ and a ground. For example, one end of the capacitor 1750 may be connected to DC+, and another end of the capacitor 1750 may be connected to the ground.

Each of the first rectification unit 1710 and the second rectification unit 1720 may include two Schottky diodes. The two Schottky diodes may be connected in parallel. For example, an anode of each of two Schottky diodes may be connected to an anode of a rectification unit, and a cathode each of the two Schottky diodes may be connected to a cathode of the rectification unit.

The first rectification unit 1710 may include, for example, two Schottky diodes 1716 and 1718.

Additionally, the first rectification unit 1710 and the second rectification unit 1720 may each include a plurality of Schottky diodes that are connected in parallel.

The third rectification unit 1730 may include a first N-MOSFET 1732, and the fourth rectification unit 1740 may include a second N-MOSFET 1742.

A gate 1734 and a source 1736 of the first N-MOSFET 1732 may be connected to RF+ and RF–, respectively. Additionally, a drain 1738 of the first N-MOSFET 1732 may be connected to the ground.

A gate 1744 of the second N-MOSFET 1742 may be connected to RF–, and a source 1746 of the second N-MOSFET 1742 may be connected to the ground. Additionally, a drain is 1748 of the second N-MOSFET 1742 may be connected to RF+.

Although various types of N-MOSFET may exist, an N-MOSFET device having a low resistance and a low input capacitance may be selected, to use the N-MOSFET device in a wireless power transmission rectifier circuit employing a resonance scheme in a band of 1 MHz to 15 MHz.

For example, in response to an N-MOSFET device having a resistance $R_{on}$ equal to or less than 200 milliohm (mΩ) and an input capacitance equal to or less than 300 picofarads (pF)

in a band of 1 MHz is used, designing a rectifier with a similar efficiency to an efficiency of a full-bridge rectifier employing a Schottky diode in an operating frequency of about 6 MHz may be possible.

Hereinafter, description will be given of an efficiency of the dual diode cross-coupled TR rectifier 1700 in which a current of 0.5 A flows, the first Schottky diode of FIG. 12A is used, and an N-MOSFET having a resistance $R_{on}$ of 200 mΩ and an input capacitance of 300 pF (1 MHz) is used.

A power $P_{diode}$ of 0.13 W may be consumed in a single dual diode (2.26 V×0.5 A=0.13 W). A power $P_{Ron}$ of 0.0375 W may be consumed in the resistance $R_{on}$. Adding a parasitic loss (+α) $P_{parastic}$ to 0.0375 W ((0.5 A)$^2$×0.2552=0.0375 W) may obtain a power consumed in the N-MOSFET.

The parasitic loss (+α) $P_{parastic}$ may be determined by the input capacitance, and the parasitic loss (+α) $P_{parastic}$ may be reduced as a frequency decreases. Additionally, in a band of 6 MHz, the parasitic loss (+α) $P_{parastic}$ may correspond to about 0.1 W.

Accordingly, an efficiency $\eta_{(CTR)rectifier}$ of the dual diode cross-coupled TR rectifier 1700 may be obtained using the following Equation 8:

$$\therefore \eta_{(CTR)rectifier} = \frac{|P_{RF}| - P_{Diode} - P_{Ron} - P_{Parasitic}}{|P_{RF}|} = \frac{3.125 - 0.13 - 0.0375 - 0.1}{3.125} = 91.4\% \quad [\text{Equation 8}]$$

Thus, the efficiency of the wireless power receiving and transmitting system 1000 may reach 90% or higher, by using the dual diode full-bridge rectifier 1400 or the dual diode cross-coupled TR rectifier 1700.

Figure 18:
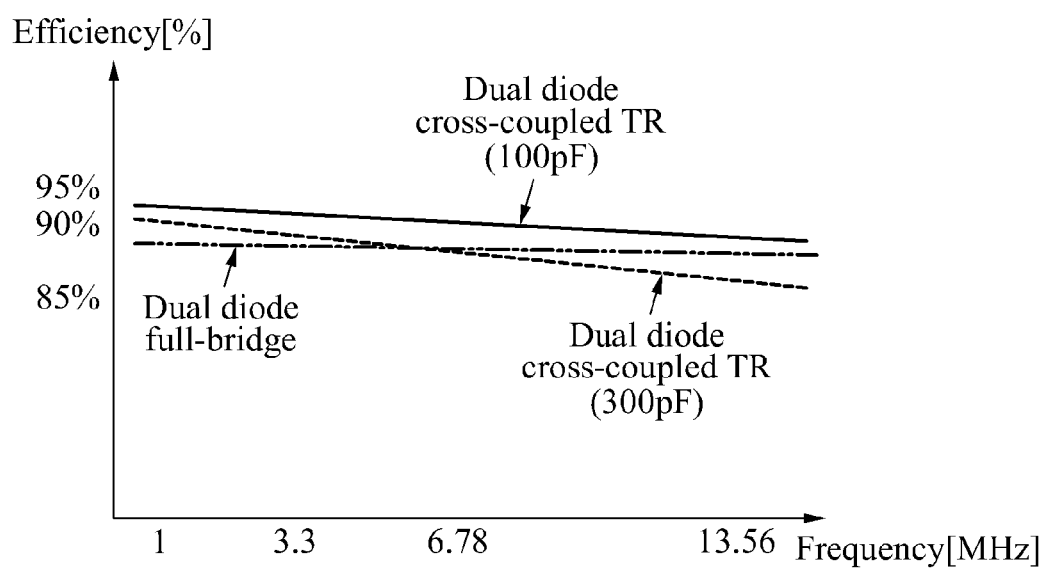
FIG. 18 is a graph illustrating a result of comparing an efficiency of the dual diode full-bridge rectifier of FIG. 14 with an efficiency of the dual diode cross-coupled TR rectifier of FIG. 17.

FIG. 18 illustrates a result of comparing the efficiency of the dual diode full-bridge rectifier 1400 of FIG. 14 with the efficiency of the dual diode cross-coupled TR rectifier 1700 of FIG. 17.

The efficiency of the dual diode full-bridge rectifier 1400 of FIG. 14, and the efficiency of the dual diode cross-coupled TR rectifier 1700 of FIG. 17 may be compared based on a frequency and an input capacitance of an N-MOSFET.

As illustrated in FIG. 18, the efficiency of the dual diode full-bridge rectifier 1400 may remain unchanged despite a change in frequency, whereas the efficiency of the dual diode cross-coupled TR rectifier 1700 may change based on a change in input capacitance and frequency.

Accordingly, to design a rectifier with a high efficiency, an appropriate rectifier structure may be selected based on an operating frequency.

Figure 19:
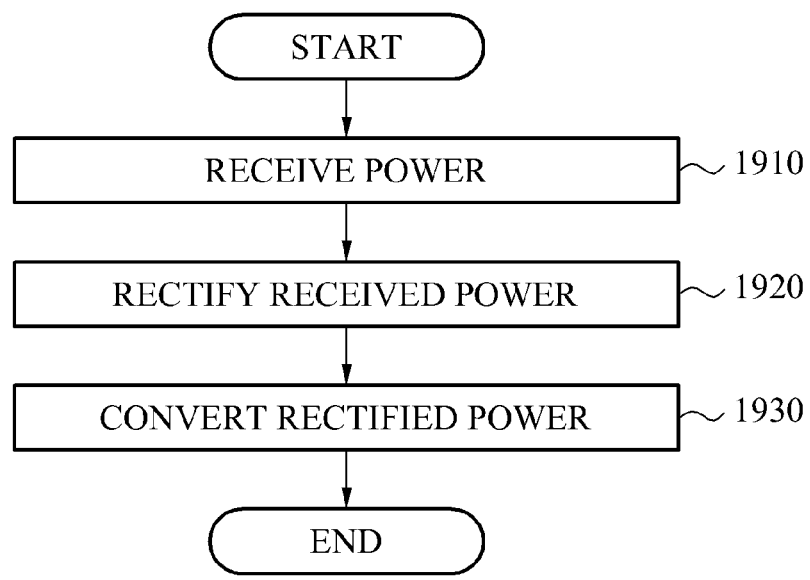
FIG. 19 is a flowchart illustrating an example of a power receiving method.

FIG. 19 illustrates an example of a power receiving method.

In 1910, the target resonator 1040 of FIG. 10 may receive a power.

In 1920, the rectifier 1050 of FIG. 10 may receive the power from the target resonator 1040 via RF+ and RF−, and rectify the received power.

The rectifier 1050 may be, for example, the dual diode full-bridge rectifier 1400 of FIG. 14 or the dual diode cross-coupled TR rectifier 1700 of FIG. 17.

In 1930, the DC/DC converter 1060 of FIG. 10 may convert the rectified power.

Technical information described above with reference to FIGS. 1 to 18 may be applied to the example of FIG. 19 and accordingly, further descriptions thereof will be omitted for conciseness.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rectifier, comprising:
a first rectification unit having an anode and a cathode, the anode being connected to a negative radio frequency (RF) port, and the cathode being connected to a positive direct current (DC) port;
a second rectification unit having an anode and a cathode, the anode being connected to a positive RF port, and the cathode being connected to the positive DC port;
a third rectification unit having an anode and a cathode, the anode being connected to a ground, and the cathode being connected to the negative RF port; and
a fourth rectification unit having an anode and a cathode, the anode being connected to the ground, and the cathode being connected to the positive RF port,
wherein the first rectification unit comprises a plurality of first diodes that are connected in parallel, and the second rectification unit comprises a plurality of second diodes that are connected in parallel.

2. The rectifier of claim 1, wherein the first rectification unit comprises two first diodes, and the second rectification unit comprises two second diodes.

3. The rectifier of claim 1, wherein the third rectification unit comprises a plurality of third diodes that are connected in parallel, and the fourth rectification unit comprises a plurality of fourth diodes that are connected in parallel.

4. The rectifier of claim 1, wherein the third rectification unit comprises a first N-metal-oxide-semiconductor field-effect transistor (N-MOSFET), wherein the fourth rectification unit comprises a second N-MOSFET, wherein a gate of the first N-MOSFET is connected to the positive RF port, a source of the first N-MOSFET is connected to the negative RF port, and a drain of the first N-MOSFET is connected to the ground, and wherein a gate of the second N-MOSFET is connected to the negative RF port, a source of the second N-MOSFET is connected to the ground, and a drain of the second N-MOSFET is connected to the positive RF port.

5. The rectifier of claim 4, wherein a resistance of the first N-MOSFET is equal to or less than 200 milliohm (m$\Omega$), and an input capacitance of the first N-MOSFET is equal to or less than 300 picofarads (pF), and wherein a resistance of the second N-MOSFET is equal to or less than 200 m$\Omega$, and an input capacitance of the second N-MOSFET is equal to or less than 300 pF.

6. The rectifier of claim 1, further comprising:

a capacitor connected to the positive DC port and the ground.

7. A power receiver, comprising:

a resonator configured to receive a power;

a rectifier configured to receive the power from the resonator via a positive radio frequency (RF) port and a negative RF port, and to rectify the received power; and a direct current (DC)-to-DC (DC/DC) converter configured to convert the rectified power, wherein the rectifier comprises:

a first rectification unit having an anode and a cathode, the anode being connected to the negative RF port, and the cathode being connected to a positive DC port;

a second rectification unit having an anode and a cathode, the anode being connected to the positive RF port, and the cathode being connected to the positive DC port;

a third rectification unit having an anode and a cathode, the anode being connected to a ground, and the cathode being connected to the negative RF port; and a fourth rectification unit having an anode and a cathode, the anode being connected to the ground, and the cathode being connected to the positive RF port, wherein the first rectification unit comprises a plurality of first diodes connected in parallel, and the second rectification unit comprises a plurality of second diodes connected in parallel.

8. The power receiver of claim 7, wherein the third rectification unit comprises a plurality of third diodes that are connected in parallel, and the fourth rectification unit comprises a plurality of fourth diodes that are connected in parallel.

9. The power receiver of claim 8, wherein the third rectification unit comprises a first N-metal-oxide-semiconductor field-effect transistor (N-MOSFET), wherein the fourth rectification unit comprises a second N-MOSFET, wherein a gate of the first N-MOSFET is connected to the positive RF port, a source of the first N-MOSFET is connected to the negative RF port, and a drain of the first N-MOSFET is connected to the ground, and wherein a gate of the second N-MOSFET is connected to the negative RF port, a source of the second N-MOSFET is connected to the ground, and a drain of the second N-MOSFET is connected to the positive RF port.

10. The power receiver of claim 8, wherein the rectifier further comprises a capacitor connected to the positive DC port and the ground.

11. A power receiving method, comprising:

receiving, by a resonator, a power;

receiving, by a rectifier, the power from the resonator via a positive radio frequency (RF) port and a negative RF port, and rectifying the received power; and converting, by a direct current (DC)-to-DC (DC/DC) converter, the rectified power, wherein the rectifier comprises:

a first rectification unit having an anode and a cathode, the anode being connected to the negative RF port, and the cathode being connected to a positive DC port;

a second rectification unit having an anode and a cathode, the anode being connected to the positive RF port, and the cathode being connected to the positive DC port;

a third rectification unit having an anode and a cathode, the anode being connected to a ground, and the cathode being connected to the negative RF port; and a fourth rectification unit having an anode and a cathode, the anode being connected to the ground, and the cathode being connected to the positive RF port, wherein the first rectification unit comprises a plurality of first diodes connected in parallel, and the second rectification unit comprises a plurality of second diodes connected in parallel.

12. The power receiving method of claim 11, wherein the third rectification unit comprises a plurality of third diodes that are connected in parallel, and the fourth rectification unit comprises a plurality of fourth diodes that are connected in parallel.

13. The power receiving method of claim 11, wherein the third rectification unit comprises a first N-metal-oxide-semiconductor field-effect transistor (N-MOSFET), wherein the fourth rectification unit comprises a second N-MOSFET, wherein a gate of the first N-MOSFET is connected to the positive RF port, a source of the first N-MOSFET is connected to the negative RF port, and a drain of the first N-MOSFET is connected to the ground, and wherein a gate of the second N-MOSFET is connected to the negative RF port, a source of the second N-MOSFET is connected to the ground, and a drain of the second N-MOSFET is connected to the positive RF port.

14. The power receiving method of claim 11, wherein the rectifier further comprises a capacitor connected to the positive DC port and the ground.

15. A non-transitory computer readable recording medium storing a program to cause a computer to implement the method of claim 11.

* * * * *